(12) United States Patent
Bai et al.

(10) Patent No.: US 10,632,453 B2
(45) Date of Patent: *Apr. 28, 2020

(54) TRIMETALLIC BASE METAL DEWAXING CATALYST

(71) Applicant: ExxonMobil Research and Engineering Company, Annandale, NJ (US)

(72) Inventors: Chuansheng Bai, Phillipsburg, NJ (US); Paul Podsiadlo, Humble, TX (US); Stephen J. McCarthy, Center Valley, PA (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 92 days.

This patent is subject to a terminal disclaimer.

(21) Appl. No.: 15/902,211

(22) Filed: Feb. 22, 2018

(65) Prior Publication Data

US 2018/0250662 A1 Sep. 6, 2018

Related U.S. Application Data

(60) Provisional application No. 62/466,722, filed on Mar. 3, 2017.

(51) Int. Cl.
| | |
|---|---|
| *B01J 29/06* | (2006.01) |
| *B01J 27/051* | (2006.01) |
| *B01J 29/40* | (2006.01) |
| *B01J 21/04* | (2006.01) |
| *B01J 35/00* | (2006.01) |
| *B01J 37/02* | (2006.01) |

(Continued)

(52) U.S. Cl.
CPC ........... *B01J 27/0515* (2013.01); *B01J 21/04* (2013.01); *B01J 29/061* (2013.01); *B01J 29/072* (2013.01); *B01J 29/076* (2013.01); *B01J 29/40* (2013.01); *B01J 29/48* (2013.01); *B01J 29/78* (2013.01); *B01J 29/7861* (2013.01); *B01J 35/0006* (2013.01); *B01J 35/1004* (2013.01); *B01J 35/1009* (2013.01); *B01J 35/1014* (2013.01); *B01J 35/1019* (2013.01); *B01J 35/1061* (2013.01); *B01J 37/0009* (2013.01); *B01J 37/0018* (2013.01); *B01J 37/0201* (2013.01); *B01J 37/0203* (2013.01); *B01J 37/0236* (2013.01); *B01J 37/20* (2013.01); *C10G 45/50* (2013.01); *C10G 45/54* (2013.01); *C10G 45/62* (2013.01); *C10G 45/64* (2013.01); *C10G 49/04* (2013.01); *C10G 49/08* (2013.01); *C10G 65/04* (2013.01); *C10G 65/043* (2013.01); *B01J 27/049* (2013.01); *B01J 37/0213* (2013.01); *B01J 2229/186* (2013.01); *B01J 2229/20* (2013.01); *B01J 2229/42* (2013.01); *C10G 2300/1048* (2013.01); *C10G 2300/202* (2013.01); *C10G 2400/04* (2013.01); *C10G 2400/10* (2013.01)

(58) Field of Classification Search
CPC ...... B01J 29/061; B01J 29/072; B01J 29/076; B01J 29/40; B01J 29/48; B01J 29/78; B01J 29/7861; B01J 2229/42; B01J 2229/20; B01J 2229/186; B01J 21/04; B01J 27/0515; B01J 27/049; B01J 35/0006; B01J 35/1061; B01J 35/1019; B01J 35/1009; B01J 35/1004; B01J 35/1014; B01J 37/0201; B01J 37/20; B01J 37/0009; B01J 37/0203; B01J 37/0018; B01J 37/0236; B01J 37/0213; C10G 2400/10; C10G 2400/04; C10G 2300/202; C10G 2300/1048
USPC ................ 502/60, 62, 64, 66, 69, 71, 74, 77
See application file for complete search history.

(56) References Cited

U.S. PATENT DOCUMENTS

| | | |
|---|---|---|
| 8,394,255 B2 | 3/2013 | McCarthy et al. |
| 2009/0071875 A1 | 3/2009 | Kato et al. |

(Continued)

FOREIGN PATENT DOCUMENTS

| | | |
|---|---|---|
| CN | 105688978 A | 6/2016 |
| EP | 0155822 A2 | 9/1985 |

(Continued)

OTHER PUBLICATIONS

The International Search Report and Written Opinion of PCT/US2018/019125 dated May 17, 2018.

(Continued)

*Primary Examiner* — Elizabeth D Wood
(74) *Attorney, Agent, or Firm* — Andrew T. Ward; Ryan L. Lobato

(57) ABSTRACT

Methods, catalysts, and corresponding catalyst precursors are provided for performing dewaxing of diesel or distillate boiling range fractions. The dewaxing methods, catalysts, and/or catalyst precursors can allow for production of diesel boiling range fuels with improved cold flow properties at desirable yields. The catalysts and/or catalyst precursors can correspond to supported base metal catalysts and/or catalyst precursors that include at least two Group 8-10 base metals supported on the catalyst, such as a catalyst/catalyst precursor including both Ni and Co as supported metals along with a Group 6 metal (i.e., Mo and/or W). The support can correspond to a support including a zeolitic framework structure. The catalyst precursors can be formed, for example, by impregnating a support including a zeolitic framework structure with an impregnation solution that also includes a dispersion agent.

8 Claims, 7 Drawing Sheets

(51) Int. Cl.

| | |
|---|---|
| *B01J 37/20* | (2006.01) |
| *B01J 37/00* | (2006.01) |
| *C10G 45/64* | (2006.01) |
| *C10G 65/04* | (2006.01) |
| *B01J 35/10* | (2006.01) |
| *C10G 49/08* | (2006.01) |
| *C10G 45/54* | (2006.01) |
| *C10G 49/04* | (2006.01) |
| *B01J 29/78* | (2006.01) |
| *C10G 45/50* | (2006.01) |
| *B01J 29/48* | (2006.01) |
| *C10G 45/62* | (2006.01) |
| *B01J 29/076* | (2006.01) |
| *B01J 29/072* | (2006.01) |
| *B01J 27/049* | (2006.01) |

(56) References Cited

U.S. PATENT DOCUMENTS

| | | |
|---|---|---|
| 2009/0139898 A1 | 6/2009 | Long et al. |
| 2010/0187155 A1 | 7/2010 | McCarthy et al. |
| 2015/0158018 A1* | 6/2015 | Zhan .................. B01J 29/166 208/96 |
| 2015/0209772 A1 | 7/2015 | Ouwehand et al. |
| 2016/0145511 A1 | 5/2016 | Xiaochun et al. |
| 2017/0175011 A1 | 6/2017 | McCarthy et al. |
| 2017/0175015 A1 | 6/2017 | Podsiadlo et al. |

FOREIGN PATENT DOCUMENTS

| | | | |
|---|---|---|---|
| EP | 1 880 760 | * | 1/2008 |
| EP | 2 072 127 | * | 6/2009 |
| JP | 2014074091 A | | 4/2014 |
| WO | 2013152577 A1 | | 10/2013 |
| WO | 2017112558 A1 | | 6/2017 |

OTHER PUBLICATIONS

The International Search Report and Written Opinion of PCT/US2016/064144 dated Dec. 21, 2015.
The International Search Report and Written Opinion of PCT/US2016/067423 dated Mar. 27, 2017.
The Internationall Search Report and Written Opinion of PCT/US2016/067717 dated Mar. 27, 2017.

* cited by examiner

TRIMETALLIC BASE METAL DEWAXING CATALYST

CROSS-REFERENCE TO RELATED APPLICATIONS

This application claims the benefit of U.S. Provisional Application No. 62/466,722, filed on Mar. 3, 2017, the entire contents of which are incorporated herein by reference.

FIELD

Catalyst compositions, catalyst precursor compositions, and corresponding methods suitable for hydroprocessing of distillate boiling range feeds are provided, such as distillate boiling range feeds suitable for fuels production.

BACKGROUND

The requirements for production of diesel boiling range fuels can potentially vary during the course of a year. During summer months, a primary goal of hydroprocessing can be reduction of sulfur and/or nitrogen content of diesel boiling range fuels in order to satisfy regulatory requirements. Sulfur reduction can also be important during winter months, but an additional consideration can be improving the cold flow properties of the diesel boiling range fuels. Dewaxing of diesel boiling range fractions can be used to provide improved cold flow properties, but this can also result in loss of product yield. Methods which can allow for improved production of diesel boiling range fuels while maintaining or improving the yield of such fuels can therefore be desirable.

U.S. Pat. No. 8,394,255 describes methods for integrated hydrocracking and dewaxing of a feed under sour conditions for formation of diesel and lubricant boiling range fractions.

SUMMARY

In various aspects, a catalyst precursor is provided comprising at least two Group 8-10 base metals, at least one Group 6 metal, and a dispersion agent supported on a support comprising a zeolitic framework structure. The catalyst precursor can have a molar ratio of a first Group 8-10 base metal to a second Group 8-10 base metal of 0.1 to 10 and/or a molar ratio of the at least two Group 8-10 base metals to the at least one Group 6 metal of 0.1 to 1.0 and/or a molar ratio of dispersion agent to the at least two Group 8-10 base metals and the at least one Group 6 metal of 0.5 to 3.0.

In some aspects, the zeolitic framework structure can comprise an MEL framework structure, such as ZSM-11. In some aspects, the MEL framework structure can comprise a molar ratio of silica to alumina of about 35 to about 55 and/or an alpha value of at least about 380 and/or a total surface area of at least about 350 $m^2/g$. In other aspects, the zeolitic framework structure can comprise ZSM-48, ZSM-11, a zeolitic framework structure having a 10-member ring as a largest pore channel, or a combination thereof.

In some aspects, the catalyst precursor can comprise about 2.0 wt % to about 30 wt % of the at least one Group 6 metal and at least two Group 8-10 base metals based on a weight of the catalyst precursor. The at least two Group 8-10 base metals can comprise Ni and Co. The at least one Group 6 metal can comprise W, Mo, or a combination thereof.

In some aspects, the dispersion agent can comprise a compound having 2-10 carbon atoms and a carbon atom to oxygen atom ratio of about 0.6 to about 2.0. The dispersion agent can comprise a glycol, a carboxylic acid, or a combination thereof. For example, the dispersion agent can comprise citric acid, gluconic acid, nitrilotriacetic acid, ethylene glycol, or a combination thereof.

In some aspects, the support can further comprise an alumina binder. The alumina binder can optionally have a surface area of about 150 $m^2/g$ or less.

In other aspects, a method of forming a composition is provided. The method can be suitable, for example, for forming a catalyst precursor according to the above aspects. The method can include impregnating a support comprising a zeolitic framework structure with a solution comprising a Group 6 metal salt, at least two Group 8-10 base metal salts, and a dispersion agent to form a catalyst precursor. The dispersion agent can comprise a compound having 2-10 carbon atoms and/or a carbon atom to oxygen atom ratio of about 0.6 to about 2.0. A molar ratio of dispersion agent to Group 8-10 non-noble metal can be about 0.5 to 5.0. The resulting catalyst precursor can then be dried at a temperature of about 80° C. to about 200° C. In some aspects, the method can further include sulfiding the catalyst precursor under effective sulfiding conditions to form a dewaxing catalyst. In some aspects, the catalyst precursor can be sulfided without prior calcining of the catalyst precursor.

In still other aspects, a method for treating a distillate boiling range feed is provided. The method can include exposing a distillate boiling range feed to a dewaxing catalyst under effective hydroprocessing conditions, the dewaxing catalyst comprising at least one Group 6 metal sulfide and at least two Group 8-10 base metal sulfides. The dewaxing catalyst can be formed, for example, by sulfiding a catalyst precursor according to the above aspects. In some aspects, the dewaxing catalyst can be formed by impregnating a support comprising a zeolitic framework structure with an impregnation solution comprising a Group 6 metal salt, at least two Group 8-10 base metal salts, and a dispersion agent to form a catalyst precursor. The dispersion agent can comprise a compound having 2-10 carbon atoms and/or a carbon atom to oxygen atom ratio of about 0.6 to about 2.0. The catalyst precursor can be dried at a temperature of about 80° C. to about 200° C. The dried catalyst precursor can then be sulfided under effective sulfiding conditions. In some aspects, the catalyst precursor can be sulfided without prior calcining of the catalyst precursor In some aspects, the dewaxing catalyst can have a ratio of a first Group 8-10 base metal to a second Group 8-10 base metal of 0.1 to 10 and/or a ratio of the at least two Group 8-10 base metals to the at least one Group 6 metal of 0.1 to 1.0. In some aspects, the catalyst precursor can have a ratio of dispersion agent to the at least two Group 8-10 base metals and the at least one Group 6 metal of 0.5 to 3.0 prior to the sulfiding.

In some aspects, the effective hydroprocessing conditions comprise at least one of effective hydrotreating conditions and effective catalytic dewaxing conditions. In some aspects, the method can further comprise exposing the distillate boiling range feed to a hydrotreating catalyst.

DETAILED DESCRIPTION OF THE EMBODIMENTS

Overview

Figure 1:
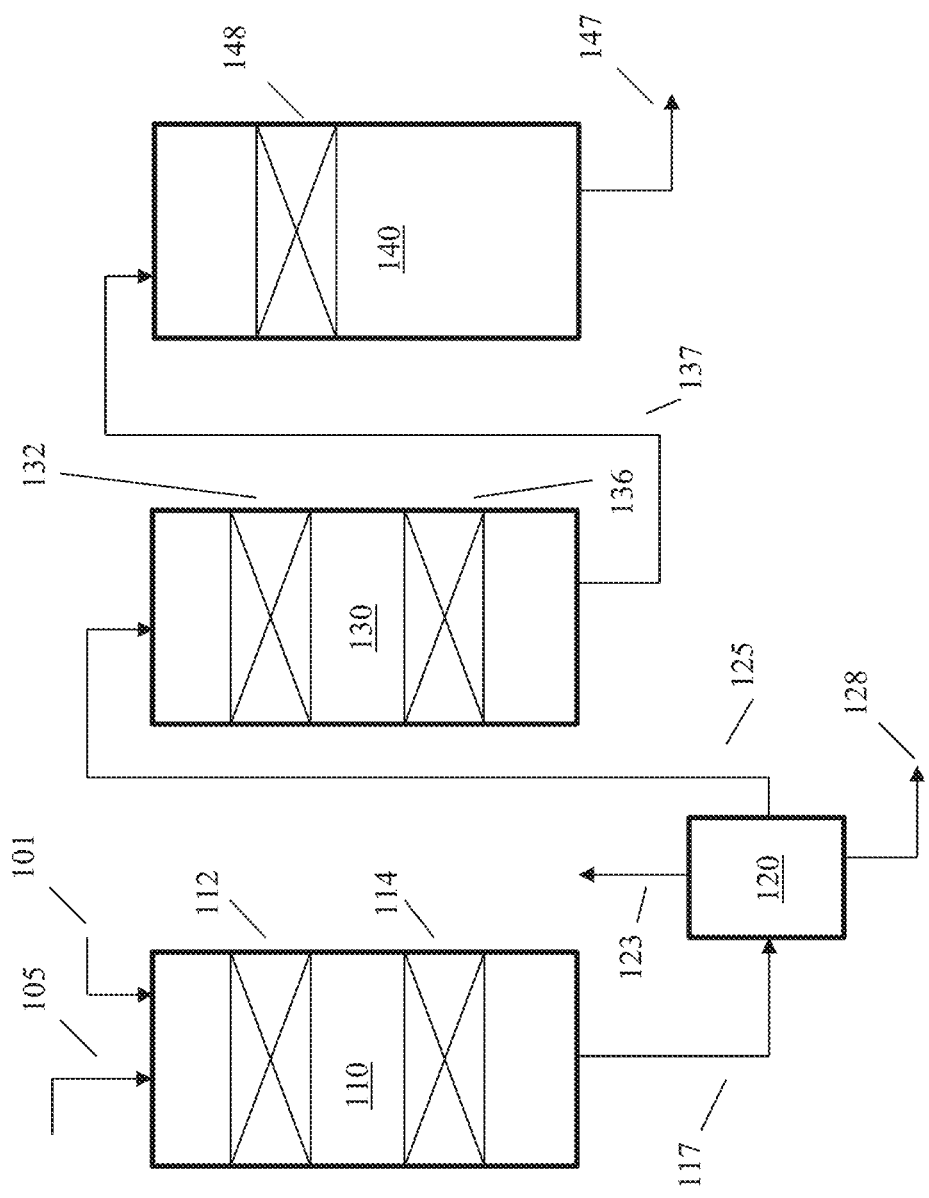
FIG. 1 shows an example of a configuration for hydroprocessing of a distillate boiling range feed.

In various aspects, methods, catalysts, and corresponding catalyst precursors are provided for performing dewaxing of diesel boiling range fractions. The dewaxing, such as trim dewaxing, can allow for production of diesel boiling range fuels with improved cold flow properties at desirable yields. The catalysts and/or catalyst precursors can correspond to supported base metal catalysts and/or catalyst precursors that include at least two Group 8-10 base metals supported on the catalyst, such as a catalyst/catalyst precursor including both Ni and Co as supported metals along with a Group 6 metal (i.e., Mo and/or W). The support can correspond to a zeolitic support (optionally including a separate binder), such as a support including a zeolitic framework structure having a 10-member ring pore channel as a largest pore channel. Examples of suitable zeolitic framework structures can include, but are not limited to, MEL (ZSM-11), MRE (ZSM-48), and MTT (ZSM-23). The catalysts can be formed, for example, by impregnating a support including a zeolitic framework structure with an impregnation solution that also includes a dispersion agent.

Introducing a dewaxing catalyst into a distillate hydrotreating environment can pose a variety of challenges. Conventional base metal dewaxing catalysts can have a reduced activity for heteroatom removal (e.g., sulfur, nitrogen) and/or reduced distillate selectivity, as compared to a hydrotreating catalyst. As a result, introducing a conventional dewaxing catalyst into an existing hydrotreatment reactor can require selection of less challenging feeds, a reduction in the amount of feed treated and distillate produced, and/or an increase in the required severity of the hydrotreatment reaction conditions. Alternatively, if a noble metal dewaxing catalyst is used as part of the catalyst bed in a hydrotreatment reactor, heteroatom removal is further reduced and dewaxing activity suppression can occur due to the presence of $H_2S$ and $NH_3$ formed during hydrotreatment. This can require increasing the reactor temperature to a higher temperature to achieve desired cold flow properties and sulfur levels, leading to shorter run lengths and additional feed conversion and corresponding yield loss.

It has been unexpectedly discovered that the difficulties in replacing conventional hydrotreating catalyst with a dewaxing catalyst can be at least partially mitigated by using a supported base metal dewaxing catalyst that includes both Ni and Co as supported metals. Using a base metal dewaxing catalyst with both supported Ni and Co can reduce or minimize the difference in desulfurization and/or denitrogenation activity between a conventional base metal hydrotreating catalyst and a base metal dewaxing catalyst. Reducing or minimizing this difference in activity can, for example, allow for inclusion of dewaxing catalyst in a distillate hydrotreating environment while maintaining a more desirable feed space velocity for a given target heteroatom content in the hydrotreated effluent.

In various aspects, the base metal dewaxing catalyst can be made using a dispersion agent during impregnation of the base metals onto the support to form a catalyst precursor. Without being bound by any particular theory, it is believed that the dispersion agent can increase dispersion of the base metals on the surface of the support and/or within the pore network of the zeolitic framework structure so that an increased number of active sites are available for reaction. Without being bound by any particular theory, it is believed that the dispersion agent can allow impregnated metals that are supported on a catalyst precursor to be present in a form where the metals are complexed by the dispersion agent. The complexed metals in the catalyst precursor can then be converted to metal sulfides, optionally without passing through an intermediate metal oxide state. This is in contrast to metals supported on a conventional catalyst, where the metals can typically be in oxide form prior to sulfidation.

In this discussion, the terms "catalyst" and "catalyst precursor" are both used. During formation of a dewaxing catalyst, a support can initially be formed that includes metals and a dispersion agent that are supported on the support. After drying, the metals and dispersion agent can remain supported on the support, with the metals being complexed by the dispersion agent. At this stage, the composition corresponds to/is defined as a "catalyst precursor" for purposes of the claims below. Prior to use for dewaxing (and/or other hydroprocessing), the catalyst precursor can be sulfided, which converts the metals to metal sulfides. The sulfiding process can also remove the dispersion agent from the support. After sulfidation, the composition corresponds to/is defined as a "catalyst" for purposes of the claims below. It is noted that to simplify the language used for describing synthesis of a catalyst, the term "catalyst" may be used informally to refer to compositional states prior to sulfidation, even though the "catalyst" corresponds to only the final sulfided composition.

Making Base Metal Dewaxing Catalyst Precursor and Dewaxing Catalyst

In various aspects, a base metal dewaxing catalyst can be formed using a support comprising one or more zeolites. Examples of suitable zeolites include, but are not limited to, zeolitic framework structures having a 10-member ring pore channel as the largest pore size channel in the framework structure. Optionally, the largest pore size channel can be a 1-D channel or a 3-D channel. Suitable framework structure types can include, but are not limited to, a) zeolites where the largest pore size channel has a pore size from about 4.8 Angstroms to about 6.0 Angstroms; b) zeolites where the largest pore size channel corresponds to a 10 member ring; c) zeolitic framework structures of framework type MRE, MEL, MTT, EUO, AEL, AFO, SFF, STF, or TON; d) zeolites having the zeolite structure corresponding to ZSM-11 and/or having the disordered zeolite structure corresponding to ZSM-48; or e) combinations thereof.

In this discussion and the claims below, a zeolite is defined to refer to a crystalline material having a porous framework structure built from tetrahedra atoms connected by bridging oxygen atoms. Examples of known zeolite frameworks are given in the "Atlas of Zeolite Frameworks" published on behalf of the Structure Commission of the International Zeolite Association", 6$^{th}$ revised edition, Ch. Baerlocher, L. B. McCusker, D. H. Olson, eds., Elsevier, N.Y. (2007) and the corresponding web site, http://www.iza-structure.org/databases/. Under this definition, a zeolite can refer to aluminosilicates having a zeolitic framework type as well as crystalline structures containing oxides of heteroatoms different from silicon and aluminum. Such heteroatoms can include any heteroatom generally known to be suitable for inclusion in a zeolitic framework, such as gallium, boron, germanium, phosphorus, zinc, antimony, tin, and/or other transition metals that can substitute for silicon and/or aluminum in a zeolitic framework.

Catalysts can be self-bound and/or can be optionally bound with a separate binder or matrix material prior to use. Binders can be resistant to temperatures of the use desired and are attrition resistant. Binders may be catalytically active or inactive and include other zeolites, other inorganic materials such as clays and metal oxides such as alumina, silica and silica-alumina. Clays may be kaolin, bentonite and montmorillonite and are commercially available. They may be blended with other materials such as silicates. Other binary porous matrix materials in addition to silica-aluminas include materials such as silica-magnesia, silica-thoria, silica-zirconia, silica-beryllia and silica-titania. Ternary materials such as silica-alumina-magnesia, silica-alumina-thoria and silica-alumina-zirconia can also be suitable for use as binders. The matrix can be in the form of a co-gel. In some aspects, the base metal dewaxing catalysts can be formulated using a low surface area binder, a low surface area binder represents a binder with a surface area of about 150 m$^2$/g or less, or about 130 m$^2$/g or less, or about 100 m$^2$/g or less, or about 80 m$^2$/g or less, or about 70 m$^2$/g or less.

The amount of zeolite in a support including a binder can be from about 30 wt % zeolite to about 100 wt % zeolite relative to the combined weight of binder and zeolite. For example, the amount of zeolite can be about 30 wt % to about 100 wt %, or about 30 wt % to about 90 wt %, or about 30 wt % to about 80 wt %, or about 30 wt % to about 70 wt %, or about 50 wt % to about 100 wt %, or about 50 wt % to about 90 wt %, or about 50 wt % to about 80 wt %, or about 50 wt % to about 70 wt %, or about 60 wt % to about 90 wt %, or about 60 wt % to about 80 wt %, or about 60 wt % to about 70 wt %.

After combining a zeolite with any optional binder, the zeolite can be extruded to form support particles. Alternatively, support particles may be formed by any other convenient method. After forming support particles, the support particles can be impregnated with the base metal salts using an impregnation solution that also includes a dispersion agent.

Impregnation, such as impregnation by incipient wetness or ion exchange in solution, is a commonly used technique for introducing metals into a catalyst that includes a support. During impregnation, a support is exposed to a solution containing a salt of the metal for impregnation. There are many variables that can affect the dispersion of the metal salt during impregnation, including the concentration of the salt, the pH of the salt solution, the point of zero charge of the support material, but not excluding other variables that may also be important during incipient wetness or ion exchange impregnation. Multiple exposure steps can optionally be performed to achieve a desired metals loading on a catalyst. After impregnating a support with a metal salt, the support can be dried to remove excess water. The drying can be performed under any convenient atmosphere, such as air, at a temperature from about 80° C. to about 200° C. Optionally but preferably, the catalyst is not calcined prior to sulfidation.

In various aspects, a catalyst/catalyst precursor can include at least two base metals from Groups 8-10 as hydrogenation or catalytic metals, the base metals preferably being Ni and Co. A catalyst/catalyst precursor can further include at least one Group 6 metal as a hydrogenation metal, preferably Mo and/or W. In some optional aspects, other metal salts for impregnation as hydrogenation or catalytic metals can generally correspond to salts of metals from Groups 6-12 of the Periodic Table based on the IUPAC system having Groups 1-18, preferably Groups 6 and 8-10. After drying of the impregnated support (which corresponds to a catalyst precursor), the amount of hydrogenation metals on the support may range from about 1.0 wt % to about 30 wt %, based on weight of the catalyst precursor. For example, the amount of hydrogenation metals can be about 1.0 wt % to about 30 wt %, or about 1.0 wt % to about 25 wt %, or about 1.0 wt % to about 20 wt %, or about 1.0 wt % to about 15 wt %, or about 1.0 wt % to about 12 wt %, or about 3.0 wt % to about 30 wt %, or about 3.0 wt % to about 25 wt %, or about 3.0 wt % to about 20 wt %, or about 3.0 wt % to about 15 wt %, or about 3.0 wt % to about 12 wt %, or about 5.0 wt % to about 30 wt %, or about 5.0 wt % to about 25 wt %, or about 5.0 wt % to about 20 wt %, or about 5.0 wt % to about 15 wt %, or about 5.0 wt % to about 12 wt %, or about 10 wt % to about 30 wt %, or about 10 wt % to about 25 wt %, or about 10 wt % to about 20 wt %, or about 10 wt % to about 15 wt %. In particular, the amount of hydrogenation metals can be about 1.0 wt % to 30 wt %, or about 5.0 wt % to about 30 wt %, or about 5 wt % to about 20 wt %, or about 10 wt % to about 25 wt %. Suitable metal salts can include typical salts used for aqueous impregnation of support particles for catalysts.

In aspects where at least two Group 8-10 base metals are included on the catalyst/catalyst precursor, the molar ratio of a first Group 8-10 base metal to a second Group 8-10 base metal can be from about 0.1 to 10, or about 0.2 to about 5.0, or about 0.3 to about 3.0. For example, if Ni is the first base metal and Co is the second base metal, the molar ratio of Ni to Co can be from about 0.1 to 10, or about 0.2 to about 5.0, or about 0.3 to about 3.0. Without being bound by any particular theory, the molar ratio of the base metals can be selected so that during hydroprocessing using the catalyst, a substantial amount of heteroatom removal occurs via both a hydrogenation mechanism (as can be catalyzed by Ni) and a hydrogenolysis mechanism (as can be catalyzed by Co). Additionally or alternately, the molar ratio of total Group 8-10 base metals (such as combined Ni+Co) to Group 6 metal (such as Mo or W) can be about 0.1 to about 1.0, or about 0.2 to about 0.8, or about 0.4 to about 0.6.

In addition to water soluble metal salts, the impregnation solution can also include one or more dispersion agents. A dispersion agent can be an organic compound comprising 2 to 10 carbons and having a ratio of carbon atoms to oxygen atoms of about 2 to about 0.6. Optionally, the dispersion agent can be a carboxylic acid. Examples of suitable dispersion agents include glycols (e.g., ethylene glycol) and carboxylic acids, such as citric acid and gluconic acid. Optionally, the dispersion agent can be an amine or other nitrogen-containing compound, such as nitrilotriacetic acid. Without being bound by any particular theory, it is believed that the dispersion agent can be removed from the catalyst precursor/catalyst during heating, calcination, and/or sulfidation steps that are performed after impregnation to form metal oxides and/or metal sulfides. In aspects where only drying of a catalyst precursor is performed prior to sulfidation, the metals on the catalyst precursor can be converted from metals complexed by the dispersion agent to metal sulfides during sulfidation without necessarily forming an intermediate metal oxide. It is believed that the dispersion agent can assist with modifying the distribution of metals across the catalyst support, which can facilitate the improved heteroatom removal activity described herein. In some aspects, the complex formed between the dispersion agent and the metal can correspond to a complex between an anion formed from the dispersion agent (such as by loss of an acidic proton) and a metal cation. References herein to a molar ratio of dispersion agent to metal are defined to include aspects where the dispersion agent is in the form of an anion derived from the dispersion agent.

The amount of dispersion agent in the impregnation solution can be selected based on the amount of metal in the solution. In some aspects, the molar ratio of dispersion agent to total metals in the solution can be about 0.1 to 5.0, or about 0.1 to 2.0, or about 0.1 to 1.0, or about 0.2 to 5.0, or about 0.2 to 2.0, or about 0.2 to 1.0, or about 0.3 to 5.0, or about 0.3 to 2.0, or about 0.3 to 1.0, or about 0.4 to 5.0, or about 0.4 to 2.0, or about 0.4 to 1.0. Additionally or alternately, the molar ratio of dispersion agent to total non-noble Group 8-10 metals in the solution can be about 0.5 to 10, or about 0.5 to 5.0, or about 0.5 to 3.0, or about 1.0 to 10, or about 1.0 to 5.0, or about 1.0 to 3.0.

After impregnating a support to form a catalyst precursor, the catalyst precursor can be at least partially dried, such as by drying at a temperature of about 80° C. to about 200° C. Under these conditions, the dispersion agent can remain on the catalyst precursor, so that hydrogenation metals that are complexed by the dispersion agent can remain in a complexed form. Optionally, a portion of the hydrogenation metals on the catalyst precursor can be in an oxide form. In some aspects, a ratio of hydrogenation metals on the catalyst precursor in oxide form to hydrogenation metals on the catalyst precursor that are complexed by the dispersion agent can be 0.2 or less, or 0.1 or less, such as down to having substantially no supported metals in oxide form. The catalyst precursor can correspond to a catalyst support with impregnated metals that are complexed by the dispersion agent. The molar ratio of dispersion agent to supported metals on a catalyst precursor can vary depending on the nature of the dispersion agent and the metal. In some aspects, the molar ratio of dispersion agent to the combined supported Group 6 and Group 8-10 metals can be about 0.5 to about 3.0, or about 0.9 to about 3.0, or about 0.9 to about 2.2. X-ray diffraction can be a suitable method for characterization of metal phases in a catalyst or catalyst precursor.

After forming a catalyst precursor with supported base metals, the base metals may be sulfided prior to use to form a sulfided base metal catalyst. The sulfidation of the metals can be performed by any convenient method, such as gas phase sulfidation or liquid phase sulfidation. Sulfidation is generally carried out by contacting a catalyst precursor (such as a catalyst precursor that includes metals complexed by a dispersion agent and/or metals in the form of metal oxides) with a sulfur containing compound, such as elemental sulfur, hydrogen sulfide or polysulfides. Hydrogen sulfide is a convenient sulfidation agent for gas phase sulfidation, and can be incorporated into a gas phase sulfidation atmosphere containing hydrogen in an amount of about 0.1 wt % to 10 wt %. Sulfidation can also be carried out in the liquid phase utilizing a combination of a polysulfide, such as a dimethyl disulfide spiked hydrocarbon stream, and hydrogen. The sulfidation can be performed at a convenient sulfidation temperature, such as a temperature from 150° C. to 500° C. The sulfidation can be performed at a convenient sulfidation pressure, such as a pressure of 100 psig to 1000 psig or more. The sulfidation time can vary depending on the sulfidation conditions, so that sulfidation times of 1 hour to 72 hours can be suitable. The resulting catalyst may also be steamed prior to use.

Processing Using Base Metal Dewaxing Catalyst—Feedstock

After forming an improved base metal dewaxing catalyst, the base metal dewaxing catalyst can be used for dewaxing of various feeds, such as diesel boiling range feeds, distillate boiling range feeds, and/or lubricant boiling range feeds. One way of defining a feedstock is based on the boiling range of the feed. One option for defining a boiling range is to use an initial boiling point for a feed and/or a final boiling point for a feed. Another option, which in some instances may provide a more representative description of a feed, is to characterize a feed based on the amount of the feed that boils at one or more temperatures. For example, a "T5" boiling point for a feed is defined as the temperature at which 5 wt % of the feed will boil off. Similarly, a "T95" boiling point is a temperature at 95 wt % of the feed will boil. A suitable ASTM method can be used for characterization of boiling points (including fractional boiling points), such as ASTM D2887.

As defined herein, a diesel boiling range feed can have a boiling range based on a T5 distillation point and/or a T10 distillation point, and a T95 distillation point and/or a T90 distillation point. In various aspects, a diesel boiling range feed or fraction is defined as a feed or fraction with a T5 distillation point of at least 177° C. and a T95 distillation point of 371° C. or less, or a T5 distillation point of at least 177° C. and a T90 distillation point of 371° C. or less, or a T10 distillation point of at least 177° C. and a T95 distillation point of 371° C. or less, or a T10 distillation point of at least 177° C. and a T90 distillation point of 371° C. or less. Additionally or alternately, a diesel boiling range fraction within a feed can be defined as the portion of a feed having a boiling range from 177° C. (as an initial boiling point) to 371° C. (as a final boiling point). As defined herein, a lubricant boiling range feed can having a boiling range based on a T5 distillation point and/or a T10 distillation point, and a T95 distillation point and/or a T90 distillation point. In various aspects, a lubricant boiling range feed or fraction is defined as a feed or fraction with a T5 distillation point of at least 371° C. and a T95 distillation point of 510° C. or less, or a T5 distillation point of at least 371° C. and a T90 distillation point of 510° C. or less, or a T10 distillation point of at least 371° C. and a T95 distillation point of 510° C. or less, or a T10 distillation point of at least 371° C. and a T90 distillation point of 510° C. or less. Additionally or alternately, a lubricant boiling range fraction within a feed can be defined as the portion of a feed having a boiling range from 371° C. (as an initial boiling point) to 510° C. (as a final boiling point). As defined herein, a distillate boiling range can be defined that represents a combination of the diesel and lubricant boiling ranges. Thus, a distillate boiling range feed can be defined as a feed or fraction with a T5 distillation point of at least 177° C. and a T95 distillation point of 510° C. or less, or a T5 distillation point of at least 177° C. and a T90 distillation point of 510° C. or less, or a T10 distillation point of at least 177° C. and a T95 distillation point of 510° C. or less, or a T10 distillation point of at least 177° C. and a T90 distillation point of 510° C. or less. Additionally or alternately, a distillate boiling range fraction within a feed can be defined as the portion of a feed having a boiling range from 177° C. (as an initial boiling point) to 510° C. (as a final boiling point).

A wide range of petroleum and chemical feedstocks can be hydroprocessed in reaction systems that include a dewaxing catalyst formed using a plurality of structure directing agents. Suitable feedstocks include whole and reduced petroleum crudes, atmospheric and vacuum residua, propane deasphalted residua, e.g., brightstock, cycle oils, FCC tower bottoms, gas oils, including vacuum gas oils and coker gas oils, light to heavy distillates including raw virgin distillates, hydrocrackates, hydrotreated oils, slack waxes, Fischer-Tropsch waxes, raffinates, and mixtures of these materials.

In embodiments involving an initial sulfur removal stage prior to hydrocracking, the sulfur content of the feed can be at least 300 ppm by weight of sulfur, or at least 1000 wppm, or at least 2000 wppm, or at least 4000 wppm, or at least 10,000 wppm, or at least 20,000 wppm. In other embodiments, including some embodiments where a previously hydrotreated and/or hydrocracked feed is used, the sulfur content can be 2000 wppm or less, or 1000 wppm or less, or 500 wppm or less, or 100 wppm or less.

In some aspects, a base metal dewaxing catalyst including at least two Group 8-10 base metals can be used to provide an improved amount of hydrotreating activity (desulfurization activity and/or denitrogenation activity) when exposed to a diesel and/or lubricant boiling range feed under effective dewaxing conditions and/or effective hydrotreating conditions. The base metal dewaxing catalyst including at least two Group 8-10 base metals can further provide a comparable level of cloud point reduction under such conditions. Effective conditions for catalytic dewaxing and hydrotreating are described in greater detail below. Optionally, additional benefit in hydrotreating activity can be obtained when the base metal dewaxing catalyst comprises a low surface area binder, such as a low surface area alumina binder. Optionally, additional benefit in hydrotreating activity can be obtained by performing dewaxing and/or hydrotreatment at higher temperatures, such as at least about 680° F. (360° C.), or at least about 700° F. (371° C.), or at least about 716° F. (380° C.). In combination with typical end of run temperatures, the additional benefit in cloud point reduction can be achieved for dewaxing temperatures of about 360° C. to about 450° C., or about 360° C. to about 425° C., or about 370° C. to about 450° C., or about 370° C. to about 425° C., or about 380° C. to about 450° C., or about 380° C. to about 425° C.

For reaction system configurations where a diesel boiling range product is produced based in part on exposure of a feed to a base metal dewaxing catalyst, the diesel boiling range product can have a cloud point of about −10° C. or less, or about −20° C. or less, or about −30° C. or less, or about −40° C. or less. Additionally or alternately, the diesel boiling range product can have a sulfur content of about 100 wppm of sulfur or less, or about 50 wppm or less, or about 25 wppm or less, or about 15 wppm or less. Additionally or alternately, the diesel boiling range product can have a nitrogen content of about 100 wppm of nitrogen or less, or about 50 wppm or less, or about 25 wppm or less, or about 15 wppm or less.

Examples of Reaction Systems for Hydroprocessing

In the discussion herein, a stage can correspond to a single reactor or a plurality of reactors. Optionally, multiple parallel reactors can be used to perform one or more of the processes, or multiple parallel reactors can be used for all processes in a stage. Each stage and/or reactor can include one or more catalyst beds containing hydroprocessing catalyst. Note that a "bed" of catalyst in the discussion below can refer to a partial physical catalyst bed. For example, a catalyst bed within a reactor could be filled partially with a hydrocracking catalyst and partially with a dewaxing catalyst. For convenience in description, even though the two catalysts may be stacked together in a single catalyst bed, the hydrocracking catalyst and dewaxing catalyst can each be referred to conceptually as separate catalyst beds.

In the discussion herein, reference will be made to a hydroprocessing reaction system. The hydroprocessing reaction system corresponds to the one or more stages, such as two stages and/or reactors and an optional intermediate separator, that are used to expose a feed to a plurality of catalysts under hydroprocessing conditions. The plurality of catalysts can be distributed between the stages and/or reactors in any convenient manner, with some preferred methods of arranging the catalyst described herein.

Various types of hydroprocessing can be used in the production of distillate fuels and/or lubricant base oils. In some aspects, diesel boiling range fuel products can be formed by exposing a diesel and/or distillate boiling range feed to hydrotreating catalyst and a base metal dewaxing catalyst under effective hydrotreating conditions. Optionally, the hydrotreating catalyst and the base metal dewaxing catalyst can be located in the same reactor. Optionally, the hydrotreating catalyst and the base metal dewaxing catalyst can be located within the same catalyst bed in a reactor. Optionally, the effluent (or at least a portion thereof) from exposing the feed to the hydrotreating catalyst and the base metal dewaxing catalyst can be exposed to an aromatic saturation catalyst. This type of configuration can allow for production of a diesel boiling range product with reduced sulfur content, reduced nitrogen content, and/or improved cold flow properties.

In other aspects, diesel boiling range fuel products can be formed by exposing a diesel and/or distillate boiling range feed to hydrotreating catalyst under effective hydrotreating conditions and a base metal dewaxing catalyst under effective dewaxing conditions. Optionally, the hydrotreating catalyst and the base metal dewaxing catalyst can be located in the same reactor. Optionally, the effluent (or at least a portion thereof) from exposing the feed to the hydrotreating catalyst and the base metal dewaxing catalyst can be exposed to an aromatic saturation catalyst. This type of configuration can allow for production of a diesel boiling range product with reduced sulfur content, reduced nitrogen content, and/or improved cold flow properties.

In still other aspects, diesel boiling range products and lubricant boiling range products can be formed by exposing a lubricant and/or distillate boiling range feed to hydrotreating catalyst under effective hydrotreating conditions; hydrocracking catalyst under effective hydrocracking conditions; and a base metal dewaxing catalyst under effective dewaxing conditions. Optionally, a separation can be performed on hydrotreated effluent and/or hydrocracked effluent prior to at least one additional stage of hydrotreatment and/or hydrocracking. This separation can correspond to a separation to remove light ends ($C_{4-}$), or this separation can also allow for separation of any fuels boiling range material formed during the exposure to the hydrotreating and/or hydrocracking catalyst(s). Optionally, a separation can be performed on hydrotreated effluent and/or hydrocracked effluent prior to at least one stage of catalytic dewaxing. This separation can correspond to a separation to remove light ends ($C_{4-}$), or this separation can also allow for separation of any fuels boiling range material formed during the exposure to the hydrotreating and/or hydrocracking catalyst(s). Optionally, the effluent (or at least a portion thereof) from exposing the feed to the base metal dewaxing catalyst can be exposed to an aromatic saturation catalyst. This type of configuration can allow for production of diesel boiling range product and/or lubricant boiling range product with reduced sulfur content, reduced nitrogen content, and/or improved cold flow properties.

FIG. 1 shows an example of a reaction system for hydroprocessing of a feed for fuels and/or lubricant base oil production. In the example shown in FIG. 1, a suitable feed 105 can be introduced into a first reactor (or reactors) 110. Hydrogen can also be introduced at various locations within the reaction system, such as hydrogen-containing stream 101. Reactor 110 is schematically shown as including at least one bed 112 of hydrotreating catalyst and at least one bed 114 of hydrocracking catalyst. Either hydrotreating catalyst bed (or beds) 112 or hydrocracking bed (or beds) 114 can be optional. After exposing the feed to the hydrotreating and/or hydrocracking catalyst under effective conditions, the resulting first effluent 117 can be passed into a separator 120. In some aspects, separator 120 can be a gas-liquid type separator for removing contaminant gases 123 generated during hydrotreatment and/or hydrocracking, such as $H_2S$ or $NH_3$. This can allow subsequent stages or catalyst beds in the reaction system to operate as "sweet" reaction stages. In other aspects, separator 120 can allow for separation of liquid hydrocarbon products 128 from the effluent that are below a desired cut point. For example, for a system for lubricant base oil production, separator 120 can allow for separation of both diesel and naphtha boiling range compounds, optionally as one or more separate streams, such as one or more diesel streams, one or more kerosene or jet streams, and/or one or more naphtha streams. As another example, for a system for diesel fuel production, separator 120 might separate out diesel and lower boiling range compounds, or separator 120 may separate out naphtha boiling range compounds while retaining diesel with the primary process flow.

After passing through separator 120, the remaining portion 125 of the effluent can be passed into a second reactor (or reactors) 130. In the example shown in FIG. 1, reactor 130 includes at least one (optional) bed 132 of a hydrotreating and/or hydrocracking catalyst and at least one bed 136 of a dewaxing catalyst. The resulting dewaxed effluent 137 can then be passed into a third reactor (or reactors) 140 for exposure to at least one (optional) bed 148 of hydrofinishing and/or aromatic saturation catalyst. Either the dewaxed effluent 137 or the hydrofinished effluent 147 can be fractionated (not shown) in order to form one or more product streams, such as lubricant base oils, distillate fuel fractions, or naphtha fuel fractions.

In some alternative aspects, a reaction system for fuels production can include fewer reactors and/or stages than the system shown in FIG. 1. For example, for hydrotreatment and dewaxing of a diesel boiling range feed and/or distillate boiling range feed for production of diesel boiling range products, just reactor 110 could be used. In such an example, a suitable feed 105 can be introduced into a first reactor (or reactors) 110. Hydrogen can also be introduced at various locations within the reaction system, such as hydrogen-containing stream 101. In this type of example, reactor 110 could include at least one bed 112 of hydrotreating catalyst and at least one bed 114 of base metal dewaxing catalyst. Alternatively, just bed(s) 112 could be included, with base metal dewaxing catalyst being included in the beds along with the hydrotreating catalyst.

Hydrotreatment Conditions

Hydrotreatment can typically be used to reduce the sulfur, nitrogen, and aromatic content of a feed. The catalysts used for hydrotreatment can include conventional hydroprocessing catalysts, for example those that comprise at least one Group VIII non-noble metal (Columns 8-10 of IUPAC periodic table), such as Fe, Co, and/or Ni, optionally Co and/or Ni; and at least one Group VI metal (Column 6 of IUPAC periodic table), such as Mo and/or W. Such hydroprocessing catalysts optionally include transition metal sulfides that are impregnated or dispersed on a refractory support or carrier such as alumina and/or silica. The support or carrier itself typically has no significant/measurable catalytic activity. Substantially carrier- or support-free catalysts, commonly referred to as bulk catalysts, generally have higher volumetric activities than their supported counterparts.

The conventional hydrotreating catalysts can either be in bulk form or in supported form. In addition to alumina and/or silica, other suitable support/carrier materials can include, but are not limited to, zeolites, titania, silica-titania, and titania-alumina. Suitable aluminas are porous aluminas such as gamma or eta having average pore sizes from 50 to 200 Å, or 75 to 150 Å; a surface area from 100 to 300 $m^2/g$, or 150 to 250 $m^2/g$; and a pore volume of from 0.25 to 1.0 $cm^3/g$, or 0.35 to 0.8 $cm^3/g$. More generally, any convenient size, shape, and/or pore size distribution for a catalyst suitable for hydrotreatment of a distillate (including lubricant base oil) boiling range feed in a conventional manner may be used. It is noted that more than one type of hydroprocessing catalyst can be used in one or multiple reaction vessels.

The at least one Group VIII non-noble metal, in oxide form, can be present in an amount ranging from 2 wt % to 40 wt %, or from 4 wt % to 15 wt %. The at least one Group VI metal, in oxide form, can be present in an amount ranging from 2 wt % to 70 wt %, or for supported catalysts from 6 wt % to 40 wt % or from 10 wt % to 30 wt %. These weight percents are based on the total weight of the catalyst. Suitable metal catalysts can include cobalt/molybdenum (1-10% Co as oxide, 10-40% Mo as oxide), nickel/molybdenum (1-10% Ni as oxide, 10-40% Co as oxide), or nickel/tungsten (1-10% Ni as oxide, 10-40% W as oxide) on alumina, silica, silica-alumina, or titania.

The hydrotreatment is carried out in the presence of hydrogen. A hydrogen stream is, therefore, fed or injected into a vessel or reaction zone or hydroprocessing zone in which the hydroprocessing catalyst is located. Hydrogen, which is contained in a hydrogen "treat gas," is provided to the reaction zone. Treat gas can be either pure hydrogen or a hydrogen-containing gas, which is a gas stream containing hydrogen in an amount that is sufficient for the intended reaction(s), optionally including one or more other gasses (e.g., nitrogen and light hydrocarbons such as methane), and which will not adversely interfere with or affect either the reactions or the products. Impurities, such as $H_2S$ and $NH_3$ are undesirable and would typically be removed from the treat gas before it is conducted to the reactor. In aspects where the treat gas stream introduced into a reaction stage contains components other than hydrogen, the treat gas can contain at least 50 vol. %, or at least 75 vol. % hydrogen, or at least 90 vol % hydrogen, or at least 95 vol % hydrogen, or at least 99 vol % hydrogen.

Hydrotreating conditions can include temperatures of 200° C. to 450° C., or 315° C. to 425° C.; pressures of 250 psig (1.8 MPag) to 5000 psig (34.6 MPag) or 300 psig (2.1 MPag) to 3000 psig (20.7 MPag); and liquid hourly space velocities (LHSV) of 0.1 $hr^{-1}$ to 10 $hr^{-1}$; and hydrogen treat rates of 100 scf/B (17.8 m³/m³) to 10,000 scf/B (1781 m³/m³), or 500 (89 m³/m³) to 10,000 scf/B (1781 m³/m³). Hydrogen can be supplied co-currently with the input feed to the hydrotreatment reactor and/or reaction zone or separately (and optionally counter-current) via a separate gas conduit to the hydrotreatment zone.

Hydrocracking Conditions

In various aspects, the reaction conditions in the reaction system can be selected to generate a desired level of conversion of a feed. Conversion of the feed can be defined in terms of conversion of molecules that boil above a temperature threshold to molecules below that threshold. The conversion temperature can be any convenient temperature, such as 700° F. (371° C.). In an aspect, the amount of conversion in the stage(s) of the reaction system can be selected to enhance diesel production while achieving a substantial overall yield of fuels. The amount of conversion can correspond to the total conversion of molecules within any stage of the fuels hydrocracker or other reaction system that is used to hydroprocess the lower boiling portion of the feed from the vacuum distillation unit. Suitable amounts of conversion of molecules boiling above 700° F. to molecules boiling below 700° F. include converting at least 25% of the 700° F.+ portion of the feedstock to the stage(s) of the reaction system, or at least 40% of the 700° F.+ portion, or at least 50%, or at least 60%, or at least 70%, or at least 75%. Additionally or alternately, the amount of conversion for the reaction system can be 85% or less, or 80% or less, or 75% or less, or 70% or less, or 60% or less, or 50% or less. Each of the above lower bounds on the amount of conversion is explicitly contemplated in conjunction with each of the above upper bounds. Still larger amounts of conversion may also produce a suitable hydrocracker bottoms for forming lubricant base oils, but such higher conversion amounts will also result in a reduced yield of lubricant base oils. Reducing the amount of conversion can increase the yield of lubricant base oils, but reducing the amount of conversion to below the ranges noted above may result in hydrocracker bottoms that are not suitable for formation of Group II, Group II+, or Group III lubricant base oils.

In order to achieve a desired level of conversion, a reaction system can include at least one hydrocracking catalyst. Hydrocracking catalysts typically contain sulfided base metals on acidic supports, such as amorphous silica alumina, cracking zeolites such as USY, or acidified alumina. Often these acidic supports are mixed or bound with other metal oxides such as alumina, titania or silica. Examples of suitable acidic supports include acidic molecular sieves, such as zeolites or silicoaluminophosphates. One example of suitable zeolite is USY, such as a USY zeolite with cell size of 24.25 Angstroms or less. Additionally or alternately, the catalyst can be a low acidity molecular sieve, such as a USY zeolite with a Si to Al ratio of at least 20, and preferably at least 40 or 50. Zeolite Beta is another example of a potentially suitable hydrocracking catalyst. Non-limiting examples of metals for hydrocracking catalysts include metals or combinations of metals that include at least one Group VIII metal, such as nickel, nickel-cobalt-molybdenum, cobalt-molybdenum, nickel-tungsten, nickel-molybdenum, and/or nickel-molybdenum-tungsten. Additionally or alternately, hydrocracking catalysts with noble metals can also be used. Non-limiting examples of noble metal catalysts include those based on platinum and/or palladium. Support materials which may be used for both the noble and non-noble metal catalysts can comprise a refractory oxide material such as alumina, silica, alumina-silica, kieselguhr, diatomaceous earth, magnesia, zirconia, or combinations thereof, with alumina, silica, alumina-silica being the most common (and preferred, in one embodiment).

In various aspects, the conditions selected for hydrocracking for fuels production and/or lubricant base stock production can depend on the desired level of conversion, the level of contaminants in the input feed to a hydrocracking stage, and potentially other factors. For example, hydrocracking conditions in a first stage (such as a sour stage) and/or a second stage (such as a sweet stage) can be selected to achieve a desired level of conversion in the reaction system. A hydrocracking process in the first stage (or otherwise under sour conditions) can be carried out at temperatures of 550° F. (288° C.) to 840° F. (449° C.), hydrogen partial pressures of from 250 psig to 5000 psig (1.8 MPag to 34.6 MPag), liquid hourly space velocities of from 0.05 h⁻¹ to 10 h⁻¹, and hydrogen treat gas rates of from 35.6 m³/m³ to 1781 m³/m³ (200 SCF/B to 10,000 SCF/B). In other embodiments, the conditions can include temperatures in the range of 600° F. (343° C.) to 815° F. (435° C.), hydrogen partial pressures of from 500 psig to 3000 psig (3.5 MPag-20.9 MPag), and hydrogen treat gas rates of from 213 m³/m³ to 1068 m³/m³ (1200 SCF/B to 6000 SCF/B). The LHSV relative to only the hydrocracking catalyst can be from 0.25 h⁻¹ to 50 h⁻¹, such as from 0.5 h⁻¹ to 20 h⁻¹, and preferably from 1.0 h⁻¹ to 4.0 h⁻¹.

In some aspects, a portion of the hydrocracking catalyst can be contained in a second reactor stage. In such aspects, a first reaction stage of the hydroprocessing reaction system can include one or more hydrotreating and/or hydrocracking catalysts. The conditions in the first reaction stage can be suitable for reducing the sulfur and/or nitrogen content of the feedstock. A separator can then be used in between the first and second stages of the reaction system to remove gas phase sulfur and nitrogen contaminants. One option for the separator is to simply perform a gas-liquid separation to remove contaminant. Another option is to use a separator such as a flash separator that can perform a separation at a higher temperature. Such a high temperature separator can be used, for example, to separate the feed into a portion boiling below a temperature cut point, such as 350° F. (177° C.) or 400° F. (204° C.), and a portion boiling above the temperature cut point. In this type of separation, the naphtha boiling range portion of the effluent from the first reaction stage can also be removed, thus reducing the volume of effluent that is processed in the second or other subsequent stages. Of course, any low boiling contaminants in the effluent from the first stage would also be separated into the portion boiling below the temperature cut point. If sufficient contaminant removal is performed in the first stage, the second stage can be operated as a "sweet" or low contaminant stage.

Still another option can be to use a separator between the first and second stages of the hydroprocessing reaction system that can also perform at least a partial fractionation of the effluent from the first stage. In this type of aspect, the effluent from the first hydroprocessing stage can be separated into at least a portion boiling below the distillate (such as diesel) fuel range, a portion boiling in the distillate fuel range, and a portion boiling above the distillate fuel range. The distillate fuel range can be defined based on a conventional diesel boiling range, such as having a lower end cut point temperature of at least 350° F. (177° C.) or at least 400° F. (204° C.) to having an upper end cut point temperature of 700° F. (371° C.) or less or 650° F. (343° C.) or less. Optionally, the distillate fuel range can be extended to include additional kerosene, such as by selecting a lower end cut point temperature of at least 300° F. (149° C.).

In aspects where the inter-stage separator is also used to produce a distillate fuel fraction, the portion boiling below the distillate fuel fraction includes, naphtha boiling range molecules, light ends, and contaminants such as $H_2S$. These different products can be separated from each other in any convenient manner. Similarly, one or more distillate fuel fractions can be formed, if desired, from the distillate boiling range fraction. The portion boiling above the distillate fuel range represents the potential lubricant base oils. In such aspects, the portion boiling above the distillate fuel range is subjected to further hydroprocessing in a second hydroprocessing stage.

A hydrocracking process in a second stage (or otherwise under non-sour conditions) can be performed under conditions similar to those used for a first stage hydrocracking process, or the conditions can be different. In an embodiment, the conditions in a second stage can have less severe conditions than a hydrocracking process in a first (sour) stage. The temperature in the hydrocracking process can be 40° F. (22° C.) less than the temperature for a hydrocracking process in the first stage, or 80° F. (44° C.) less, or 120° F. (66° C.) less. The pressure for a hydrocracking process in a second stage can be 100 psig (690 kPa) less than a hydrocracking process in the first stage, or 200 psig (1380 kPa) less, or 300 psig (2070 kPa) less. Additionally or alternately, suitable hydrocracking conditions for a second (non-sour) stage can include, but are not limited to, conditions similar to a first or sour stage. Suitable hydrocracking conditions can include temperatures of 550° F. (288° C.) to 840° F. (449° C.), hydrogen partial pressures of from 250 psig to 5000 psig (1.8 MPag to 34.6 MPag), liquid hourly space velocities of from 0.05 $h^{-1}$ to 10 $h^{-1}$, and hydrogen treat gas rates of from 35.6 $m^3/m^3$ to 1781 $m^3/m^3$ (200 SCF/B to 10,000 SCF/B). In other embodiments, the conditions can include temperatures in the range of 600° F. (343° C.) to 815° F. (435° C.), hydrogen partial pressures of from 500 psig to 3000 psig (3.5 MPag-20.9 MPag), and hydrogen treat gas rates of from 213 $m^3/m^3$ to 1068 $m^3/m^3$ (1200 SCF/B to 6000 SCF/B). The liquid hourly space velocity can vary depending on the relative amount of hydrocracking catalyst used versus dewaxing catalyst. Relative to the combined amount of hydrocracking and dewaxing catalyst, the LHSV can be from 0.2 $h^{-1}$ to 10 $h^{-1}$, such as from 0.5 $h^{-1}$ to 5 $h^{-1}$ and/or from 1 $h^{-1}$ to 4 $h^{-1}$. Depending on the relative amount of hydrocracking catalyst and dewaxing catalyst used, the LHSV relative to only the hydrocracking catalyst can be from 0.25 $h^{-1}$ to 50 $h^{-1}$, such as from 0.5 $h^{-1}$ to 20 $h^{-1}$, and preferably from 1.0 $h^{-1}$ to 4.0 $h^1$.

In still another embodiment, the same conditions can be used for hydrotreating and hydrocracking beds or stages, such as using hydrotreating conditions for both or using hydrocracking conditions for both. In yet another embodiment, the pressure for the hydrotreating and hydrocracking beds or stages can be the same.

Catalytic Dewaxing Process

In some aspects, a base metal dewaxing catalyst including at least two Group 8-10 base metals can be included in the same stage and/or the same reactor and/or the same bed as hydrotreating catalyst. The base metal dewaxing catalyst can be mixed with the hydrotreating catalyst and/or the base metal dewaxing catalyst can be downstream (within the same bed or in a different bed) relative to at least a portion of the hydrotreating catalyst or relative to substantially all of the hydrotreating catalyst.

In other aspects, a base metal dewaxing catalyst including at least two Group 8-10 base metals can be located in a bed downstream from any hydrocracking catalyst stages and/or any hydrocracking catalyst present in a stage. This can allow the dewaxing to occur on molecules that have already been hydrotreated or hydrocracked to remove a significant fraction of organic sulfur- and nitrogen-containing species. The dewaxing catalyst can be located in the same reactor as at least a portion of the hydrocracking catalyst in a stage. Alternatively, the effluent from a reactor containing hydrocracking catalyst, possibly after a gas-liquid separation, can be fed into a separate stage or reactor containing the dewaxing catalyst. In still other aspects, dewaxing catalyst can be used in a catalyst bed prior to (i.e., upstream relative to the process flow) at least one bed of hydrotreating and/or hydrocracking catalyst.

In various aspects, at least a portion of the dewaxing catalyst can correspond to a base metal dewaxing catalyst including at least two Group 8-10 base metals as described herein. Such a dewaxing catalyst can be used alone, or in conjunction with one or more other additional dewaxing catalysts.

Additional suitable dewaxing catalysts can include molecular sieves such as crystalline aluminosilicates (zeolites). In an embodiment, the molecular sieve can comprise, consist essentially of, or be ZSM-5, ZSM-11, ZSM-22, ZSM-23, ZSM-35, ZSM-48, zeolite Beta, TON (Theta-1), or a combination thereof, for example ZSM-23 and/or ZSM-48, or ZSM-48 and/or zeolite Beta. Optionally, molecular sieves that are selective for dewaxing by isomerization as opposed to cracking can be used, such as ZSM-48, zeolite Beta, ZSM-23, or a combination thereof. Additionally or alternately, the molecular sieve can comprise, consist essentially of, or be a 10-member ring 1-D molecular sieve. Examples include EU-1, ZSM-35 (or ferrierite), ZSM-11, ZSM-57, NU-87, SAPO-11, ZSM-48, ZSM-23, and ZSM-22; for example EU-2, EU-11, ZBM-30, ZSM-48, or ZSM-23; such as ZSM-48. Note that a zeolite having the ZSM-23 structure with a silica to alumina ratio of from 20:1 to 40:1 can sometimes be referred to as SSZ-32. Other molecular sieves that are isostructural with the above materials include NU-10, EU-13, KZ-1, and NU-23. Optionally, the additional dewaxing catalyst(s) can include a binder for the molecular sieve, such as alumina, titania, silica, silica-alumina, zirconia, or a combination thereof, for example alumina and/or titania or silica and/or zirconia and/or titania.

In some aspects, the additional dewaxing catalyst(s) used in processes according to the invention can be catalysts with a low ratio of silica to alumina. For example, for ZSM-48, the ratio of silica to alumina in the zeolite can be less than 200:1, such as less than 110:1, or less than 100:1, or less than 90:1, or less than 75:1. In various embodiments, the ratio of silica to alumina can be from 50:1 to 200:1, such as 60:1 to 160:1, or 70:1 to 100:1.

In various aspects, the additional dewaxing catalyst(s) can further include a metal hydrogenation component. The metal hydrogenation component can typically be a Group VI and/or a Group VIII metal, such as a Group VIII noble metal. For example, the metal hydrogenation component can be Pt, Pd, or a mixture thereof. In an alternative aspect, the metal hydrogenation component can be a combination of a non-noble Group VIII metal with a Group VI metal. Suitable combinations can include Ni, Co, or Fe with Mo or W, preferably Ni with Mo or W.

The metal hydrogenation component may be added to an additional catalyst in any convenient manner. One technique for adding the metal hydrogenation component is by incipient wetness. For example, after combining a zeolite and a binder, the combined zeolite and binder can be extruded into catalyst particles. These catalyst particles can then be exposed to a solution containing a suitable metal precursor. Alternatively, metal can be added to the catalyst by ion exchange, where a metal precursor is added to a mixture of zeolite (or zeolite and binder) prior to extrusion.

The amount of metal in an additional dewaxing catalyst can be at least 0.1 wt % based on catalyst, or at least 0.15 wt %, or at least 0.2 wt %, or at least 0.25 wt %, or at least 0.3 wt %, or at least 0.5 wt % based on catalyst. The amount of metal in the catalyst can be 20 wt % or less based on catalyst, or 10 wt % or less, or 5 wt % or less, or 2.5 wt % or less, or 1 wt % or less. For aspects where the metal is Pt, Pd, another Group VIII noble metal, or a combination thereof, the amount of metal can be from 0.1 to 5 wt %, preferably from 0.1 to 2 wt %, or 0.25 to 1.8 wt %, or 0.4 to 1.5 wt %. For embodiments where the metal is a combination of a non-noble Group VIII metal with a Group VI metal, the combined amount of metal can be from 0.5 wt % to 20 wt %, or 1 wt % to 15 wt %, or 2.5 wt % to 10 wt %.

The additional dewaxing catalysts useful in processes according to the invention can also include a binder. In some aspects, the dewaxing catalysts can be formulated using a low surface area binder, a low surface area binder represents a binder with a surface area of 100 m$^2$/g or less, or 80 m$^2$/g or less, or 70 m$^2$/g or less. The amount of zeolite in a catalyst formulated using a binder can be from 30 wt % zeolite to 90 wt % zeolite relative to the combined weight of binder and zeolite. Preferably, the amount of zeolite is at least 50 wt % of the combined weight of zeolite and binder, such as at least 60 wt % or from 65 wt % to 80 wt %. Optionally, the dewaxing catalyst can include a binder for the molecular sieve, such as alumina, titania, silica, silica-alumina, zirconia, or a combination thereof. In a preferred embodiment, the binder can be alumina. In another embodiment, the binder can be alumina, titania, or a combination thereof. In still another embodiment, the binder can be titania, silica, zirconia, or a combination thereof.

A zeolite can be combined with binder in any convenient manner. For example, a bound catalyst can be produced by starting with powders of both the zeolite and binder, combining and mulling the powders with added water to form a mixture, and then extruding the mixture to produce a bound catalyst of a desired size. Extrusion aids can also be used to modify the extrusion flow properties of the zeolite and binder mixture.

Process conditions in a catalytic dewaxing zone can include a temperature of from 200 to 450° C., preferably 270 to 400° C., a hydrogen partial pressure of from 1.8 MPag to 34.6 MPag (250 psig to 5000 psig), preferably 4.8 MPag to 20.7 MPag, and a hydrogen treat gas rate of from 35.6 m$^3$/m$^3$ (200 SCF/B) to 1781 m$^3$/m$^3$ (10,000 scf/B), preferably 178 m$^3$/m$^3$ (1000 SCF/B) to 890.6 m$^3$/m$^3$ (5000 SCF/B). In still other embodiments, the conditions can include temperatures in the range of 600° F. (343° C.) to 815° F. (435° C.), hydrogen partial pressures of from 500 psig to 3000 psig (3.6 MPag-20.7 MPag), and hydrogen treat gas rates of from 213 m$^3$/m$^3$ to 1068 m$^3$/m$^3$ (1200 SCF/B to 6000 SCF/B). These latter conditions may be suitable, for example, if the dewaxing stage is operating under sour conditions. The liquid hourly space velocity (LHSV) can be from 0.2 h$^{-1}$ to 10 h$^{-1}$, such as from 0.5 h$^{-1}$ to 5 h$^{-1}$ and/or from 1 h$^{-1}$ to 4 h$^{-1}$.

Additionally or alternately, the conditions for dewaxing can be selected based on the conditions for a preceding reaction in the stage, such as hydrocracking conditions or hydrotreating conditions. Such conditions can be further modified using a quench between previous catalyst bed(s) and the bed for the dewaxing catalyst. Instead of operating the dewaxing process at a temperature corresponding to the exit temperature of the prior catalyst bed, a quench can be used to reduce the temperature for the hydrocarbon stream at the beginning of the dewaxing catalyst bed. One option can be to use a quench to have a temperature at the beginning of the dewaxing catalyst bed that is the same as the outlet temperature of the prior catalyst bed. Another option can be to use a quench to have a temperature at the beginning of the dewaxing catalyst bed that is at least 10° F. (6° C.) lower than the prior catalyst bed, or at least 20° F. (11° C.) lower, or at least 30° F. (16° C.) lower, or at least 40° F. (21° C.) lower.

As still another option, the dewaxing catalyst in the final reaction stage can be mixed with another type of catalyst, such as hydrotreating catalyst, in at least one bed in a reactor. As yet another option, a hydrocracking catalyst and a dewaxing catalyst can be co-extruded with a single binder to form a mixed functionality catalyst.

Hydrofinishing and/or Aromatic Saturation Process

In some aspects, a hydrofinishing and/or aromatic saturation stage can also be provided. The hydrofinishing and/or aromatic saturation can occur after the last hydrocracking or dewaxing stage. The hydrofinishing and/or aromatic saturation can occur either before or after fractionation. If hydrofinishing and/or aromatic saturation occurs after fractionation, the hydrofinishing can be performed on one or more portions of the fractionated product, such as being performed on the bottoms from the reaction stage (i.e., the hydrocracker bottoms). Alternatively, the entire effluent from the last hydrocracking or dewaxing process can be hydrofinished and/or undergo aromatic saturation.

In some situations, a hydrofinishing process and an aromatic saturation process can refer to a single process performed using the same catalyst. Alternatively, one type of catalyst or catalyst system can be provided to perform aromatic saturation, while a second catalyst or catalyst system can be used for hydrofinishing. Typically a hydrofinishing and/or aromatic saturation process will be performed in a separate reactor from dewaxing or hydrocracking processes for practical reasons, such as facilitating use of a lower temperature for the hydrofinishing or aromatic saturation process. However, an additional hydrofinishing reactor following a hydrocracking or dewaxing process but prior to fractionation could still be considered part of a second stage of a reaction system conceptually.

Hydrofinishing and/or aromatic saturation catalysts can include catalysts containing Group VI metals, Group VIII metals, and mixtures thereof. In an embodiment, preferred metals include at least one metal sulfide having a strong hydrogenation function. In another embodiment, the hydrofinishing catalyst can include a Group VIII noble metal, such as Pt, Pd, or a combination thereof. The mixture of metals may also be present as bulk metal catalysts wherein the amount of metal is 30 wt. % or greater based on catalyst. Suitable metal oxide supports include low acidic oxides such as silica, alumina, silica-aluminas or titania, preferably alumina. The preferred hydrofinishing catalysts for aromatic saturation will comprise at least one metal having relatively strong hydrogenation function on a porous support. Typical support materials include amorphous or crystalline oxide materials such as alumina, silica, and silica-alumina. The support materials may also be modified, such as by halogenation, or in particular fluorination. The metal content of the catalyst is often as high as 20 weight percent for non-noble metals. In an embodiment, a preferred hydrofinishing catalyst can include a crystalline material belonging to the M41S class or family of catalysts. The M41S family of catalysts are mesoporous materials having high silica content. Examples include MCM-41, MCM-48 and MCM-50. A preferred member of this class is MCM-41. If separate catalysts are used for aromatic saturation and hydrofinishing, an aromatic saturation catalyst can be selected based on activity and/or selectivity for aromatic saturation, while a hydrofinishing catalyst can be selected based on activity for improving product specifications, such as product color and polynuclear aromatic reduction.

Hydrofinishing conditions can include temperatures from 125° C. to 425° C., preferably 180° C. to 280° C., a hydrogen partial pressure from 500 psig (3.4 MPa) to 3000 psig (20.7 MPa), preferably 1500 psig (10.3 MPa) to 2500 psig (17.2 MPa), and liquid hourly space velocity from 0.1 $hr^{-1}$ to 5 $hr^{-1}$ LHSV, preferably 0.5 $hr^{-1}$ to 2.0 $hr^{-1}$. Additionally, a hydrogen treat gas rate of from 35.6 $m^3/m^3$ to 1781 $m^3/m^3$ (200 SCF/B to 10,000 SCF/B) can be used.

In some optional aspects where the feed includes a lubricant boiling range portion (i.e., a portion of the feed has a boiling point greater than 371° C.), after hydroprocessing the bottoms from the hydroprocessing reaction system can have a viscosity index (VI) of at least 95, such as at least 105 or at least 110. In such optional aspects, the amount of saturated molecules in the bottoms from the hydroprocessing reaction system can be at least 90%, while the sulfur content of the bottoms is less than 300 wppm. Thus, in such optional aspects, the bottoms from the hydroprocessing reaction system can be suitable for use as a Group II and/or Group III lubricant base oil.

EXAMPLES

The following examples use bound ZSM-11 (a catalyst support including an MEL framework structure) to illustrate the benefits of using a base metal dewaxing catalyst including two or more Group 8-10 base metals. However, it is understood that other catalyst supports with different zeolitic framework structures, such as ZSM-48 (MRE), can be used as a zeolitic support in a catalyst including two or more Group 8-10 base metals.

Example 1: Preparation of ZSM-11

A mixture was prepared from about 8250 g of water, about 1540 g of tetra-n-butylammonium bromide (50% solution) as a structure directing agent or template, about 2750 g of Ultrasil silica, about 1010 g of aluminum sulfate solution (47%), about 880 g of 50% sodium hydroxide solution, and about 30 g of ZSM-11 seeds. The mixture had the following molar composition:

TABLE

| Example 1 | |
|---|---|
| Reactants | Molar ratio |
| $SiO_2:Al_2O_3$ | ~50.2 |
| $H_2O:SiO_2$ | ~13.9 |
| $OH^-:SiO_2$ | ~0.15 |
| $Na^+/SiO_2$ | ~0.26 |
| template/$SiO_2$ | ~0.06 |

The mixture was reacted at about 250° F. (121° C.) in a 5-gal autoclave with stirring at about 350 RPM for 120 hours. The product was filtered, washed with deionized (DI) water and dried at about 250° F. (120° C.). The XRD pattern of the as-synthesized material showed the typical pure phase of ZSM-11 topology. The SEM of the as-synthesized material showed morphology of agglomerates composed of small crystallites with size of <0.05 micron. The as-synthesized crystals were converted into the hydrogen form by three ion exchanges with ammonium nitrate solution at room temperature, followed by drying at about 250° F. (120° C.) and calcination at about 1000° F. (540° C.) for 6 hours. The resulting MA-ZSM-11 crystals had a $SiO_2/Al_2O_3$ molar ratio of ~45; a total surface area (total SA=micropore SA+mesopore SA) of 481 $m^2/g$ (364 $m^2/g$ micropore+117 $m^2/g$ mesopore); hexane sorption of about 96.9 mg/g; and an Alpha value of about 750.

Example 2: Extrusion of Small, Medium Activity ZSM-11 Crystals with Alumina Binders 65 parts (basis: calcined ~538° C.) of ZSM-11 crystal with silica/alumina molar ratio of ~45/1 (Example 1) were mixed with about 35 parts of pseudoboehmite alumina (basis: calcined ~538° C.) in a Simpson muller. Sufficient water was added to produce an extrudable paste on a 2" Bonnot extruder. The mix of ZSM-11, pseudoboehmite alumina, and water containing paste was extruded and dried in a hotpack oven at ~121° C. overnight. The dried extrudate was calcined in nitrogen at ~538° C. to decompose and remove the organic template. The $N_2$ calcined extrudate was humidified with saturated air and exchanged with 1 N ammonium nitrate to remove sodium (spec: <500 ppm Na). After ammonium nitrate exchange, the extrudate was washed with deionized water to remove residual nitrate ions prior to drying. The ammonium exchanged extrudate was dried at ~121° C. overnight and calcined in air at ~538° C. Several extrusions were made with varying zeolite/binder ratios. Catalyst 2a corresponded to a 65/35 ratio of zeolite to alumina described above. Catalyst 2b corresponded to a 50/50 ratio of zeolite to alumina. Catalyst 2c corresponded to a 35/65 ratio. Catalyst 2d corresponded to a 80/20 ratio of zeolite to alumina. Catalyst 2e corresponded to a 90/10 ratio of zeolite to alumina. Catalyst 2f corresponded to a 65/35 ratio of an alternative alumina binder (Catapal 200) with a lower surface area than the pseudobohemite binder (Versal 300) used for Catalysts 2a-2e. The Alpha and BET $N_2$ porosity data for these catalysts are summarized in Table 2 below.

TABLE 2

Extruded ZSM-11 catalyst particle properties

| | Alpha value | n-hexane uptake (mg/g) | Micropore surface area ($m^2/g$) | External surface area ($m^2/g$) | Pore volume (cc/g) | Median pore size (nm) |
|---|---|---|---|---|---|---|
| 2a | 440 | 73.9 | 198.8 | 220.4 | 0.71 | 9.7 |
| 2b | 390 | 64.8 | 151.7 | 243.9 | 0.70 | 8.4 |
| 2c | 290 | 55.1 | 81.5 | 294.3 | 0.75 | 8.3 |
| 2d | 410 | 87.2 | 280.8 | 178.3 | 0.60 | 9.4 |
| 2e | 600 | 83.8 | 320.7 | 162.8 | 0.67 | 11.6 |
| 2f | 400 | 70.7 | 253.4 | 117.2 | 0.49 | 11.8 |

Example 3: Preparation of Base Metal ZSM-11 Catalyst Precursors with Dispersion Agents Extrudates similar to those made in Example 2a were used as supports for base metals. The extrudates included an alumina (Versal 300) binder. The absorption capacity of the extrudates was estimated using deionized water. The Ni, Co, and Mo precursor compounds used in the catalyst preparations were nickel carbonate hydroxide tetrahydrate, cobalt carbonate, and ammonium heptamolybdate tetrahydrate, respectively. Citric acid was included in the impregnation solution as a dispersion agent. The absorption capacity of the extrudate was measured as ~0.60 ml/g The volume of the impregnation solution was targeted as ~95% of the absorption capacity of the extrudates. To avoid damaging the extrudates during impregnation, the extrudates were humidified with air bubbling through a water bath at room temperature for ~16 hours.

To make the trimetallic base metal catalyst precursor, about 5.38 g of citric acid was dissolved in ~7.0 g of deionized water, heating up the solution to 60° C. while stirring. About 0.8228 g of nickel carbonate hydroxide tetrahydrate and 0.9362 g of cobalt carbonate were slowly added into the citric acid solution. This was followed by the addition of ~6.26 g of ammonium heptamolybdate tetrahydrate. The solution was stirred until the solution was clear. The solution was then cooled to room temperature. These amounts yielded a solution with an (Ni+Co):Mo molar ratio of ~0.4, a Ni:Co molar ratio of ~1.0, and a citric acid/(Ni+Co) molar ratio of ~2.

The total solution volume was adjusted with deionized water to achieve the desired volume for impregnation (~11.4 ml), and the solution was impregnated onto ~20.0 g of the extrudate from Example 2a. After impregnation the catalyst was dried in air at ~120° C. for ~16 hrs. The catalyst precursor was then stored in a sealed vessel to prevent absorption of moisture from the air. It is noted that a subsequent calcination was not performed after drying. The resulting catalyst included about 1.7 wt % Ni, about 1.7 wt % Co, and about 14 wt % Mo on the zeolite support relative to the total weight of the catalyst precursor.

Extrudates similar to those made in Example 2a were also used as supports to make supported NiMo and CoMo catalyst precursors using methods and reagents similar to those described for the NiCoMo catalyst precursor. The resulting NiMo catalyst precursor included about 3.4 wt % Ni and about 14 wt % Mo on the zeolite support relative to the total weight of the catalyst precursor. The resulting CoMo catalyst precursor included about 3.4 wt % Co and about 14 wt % Mo on the zeolite support relative to the total weight of the catalyst precursor.

To make the NiMo base metal catalyst precursor, about 134.5 g of citric acid was dissolved in ~378.6 g of deionized water, heating up the solution to ~60° C. while stirring. Once the solution was clear and at ~60° C., about 41.1 g of nickel carbonate hydroxide tetrahydrate was slowly added into the citric acid solution. This was followed by the addition of ~156.6 g of ammonium heptamolybdate tetrahydrate. The solution was stirred until the solution was clear. The solution was then cooled to room temperature. These amounts yielded a solution with a citric acid/Ni molar ratio of ~2. The solution was then used to impregnate 500 g of extrudates using a large impregnation cone. The solution was sprayed into the cone for about 20 minutes while rotating the cone at ~2 RPM. After all of the solution was applied, the extrudates in the cone were tumbled for another 30 minutes at ~2 RPM. The resulting catalyst was then dried for 1 hour in air at ~120° C. A similar procedure was used to create the CoMo base metal catalyst precursor.

Table 3 provides additional description of the base metal catalyst precursors.

TABLE 3

Properties of Base Metal Catalyst Precursors

| Description | NiMo Precursor | CoMo Precursor | NiCoMo Precursor |
|---|---|---|---|
| Loading Density of 14/25 mesh catalyst, g/cm$^3$ | 0.771 | 0.745 | 0.756 |
| Loaded volume (cm$^3$) | 1.5 | 1.5 | 1.5 |
| Loaded weight, g | 1.157 | 1.118 | 1.133 |
| Molybdenum Conc. (wt. %) | 11.5 | 11.8 | 9.2 |
| Mo content in sample (moles of Mo) | 0.00139 | 0.00137 | 0.00109 |

Example 4: Distillate Dewaxing Evaluation of Base Metal Dewaxing Catalysts

The catalyst precursors from Example 3 were sulfided to form catalysts and evaluated for heteroatom removal cloud point reduction of a distillate feed in a tri-phase fixed bed reactor. For the evaluation, the catalyst precursors were sized and loaded into the reactor as 14/20 mesh particles. The reactor was placed in a sandbath to provide isothermal operating conditions. After loading, the catalyst precursors were dried for 2 hours under flowing $N_2$ at 110° C. and 600 psig (~4.1 MPag), followed by holding the reactor at 110° C. and ~4.1 MPag of $H_2$ for roughly 2 hours. Following drying, the sulfidation process to form catalyst from the catalyst precursor was started by performing catalyst precursor wetting at 110° C., 1000 psig (~6.9 MPag), and 2250 SCF/B (~400 Nm$^3$/m$^3$) of $H_2$ with a light gas oil feed. This was followed by heating the reactor to 204° C., at which point the feed was switched to a spiked light gas oil containing 2.5 wt % sulfur (spiking was performed with dimethyldisulfide) at a LHSV of 2.0 hr$^1$ while maintaining the $H_2$ treat gas flow at ~400 Nm$^3$/m$^3$. After introducing the spiked light gas oil, the reactor was heated to ~250° C. at a rate of ~45° C./hr under the same liquid and gas flow rates and held for at least 8 hours. The temperature was then ramped to ~320° C. at ~45° C./hr and held at that temperature for roughly 5 hours.

After this final temperature hold, a distillate feed for processing was introduced into the reactor. Table 4 shows the properties of the distillate feed for processing.

TABLE 4

Distillate Feed

| 1% off (wt % D2887) | 168 (° C.) |
|---|---|
| 5% off | 225 |
| 10% off | 252 |
| 20% off | 286 |
| 30% off | 314 |
| 40% off | 338 |
| 50% off | 357 |
| 60% off | 370 |
| 70% off | 381 |
| 80% off | 394 |
| 90% off | 412 |
| 95% off | 426 |
| 99% off | 449 |
| API Gravity | 29.0 |
| Sulfur (wt %) | 1.01 |
| Nitrogen (wppm) | 460 |
| Cloud point (D5573) | 13° C. |

Figure 2:
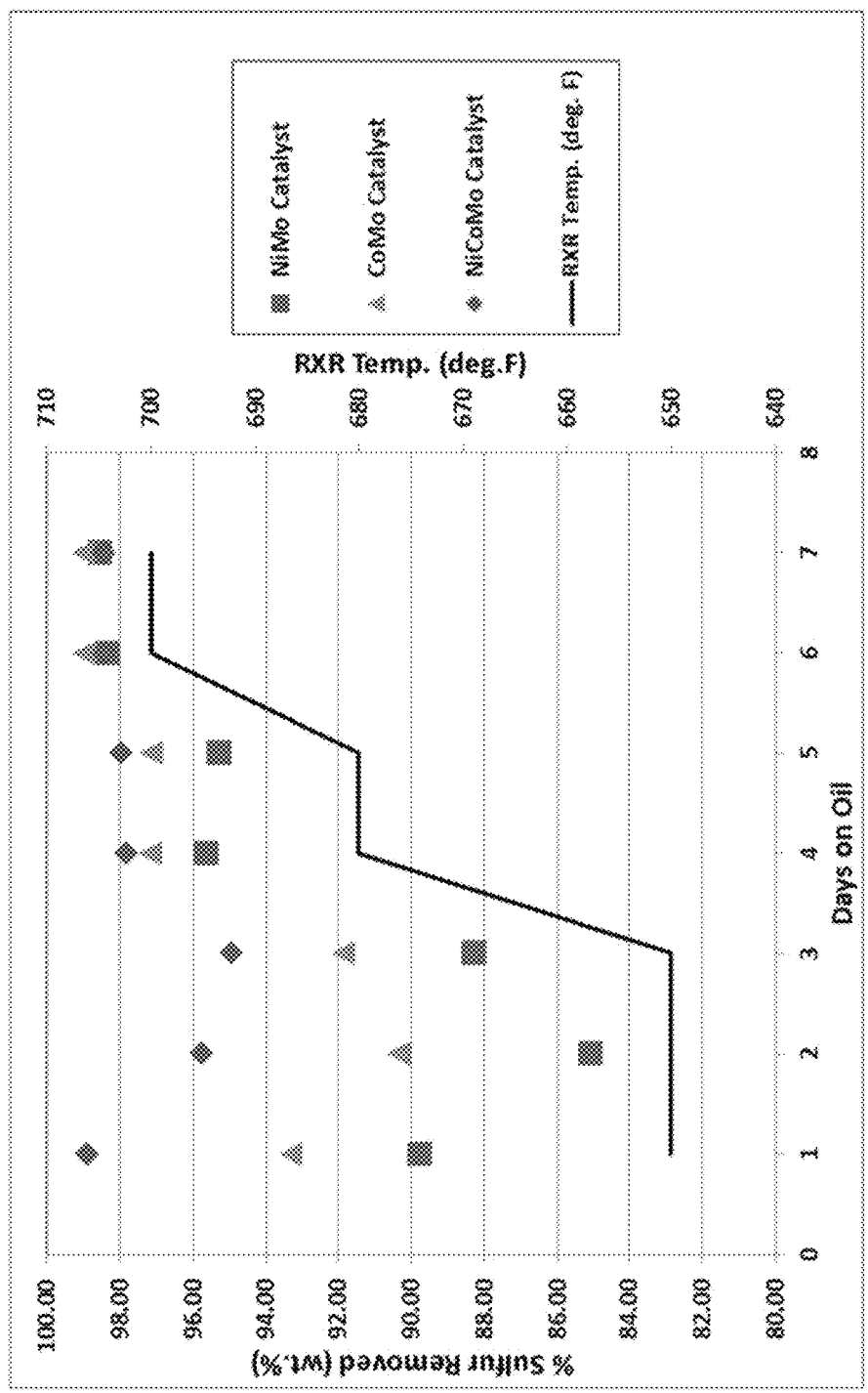
FIG. 2 shows results for sulfur removal during processing a distillate feed over various supported base metal dewaxing catalysts.

The performance of the sulfided catalysts formed from the catalyst precursors in Example 3 was evaluated based on activity for sulfur removal, nitrogen removal, and cloud point reduction. With regard to sulfur removal, FIG. 2 shows sulfur removal results based on exposing the feed in Table 4 to the three catalyst loadings shown in Table 3. As shown in FIG. 2, the NiCoMo catalyst provided greater than 95 wt % sulfur removal under the reaction conditions for all temperatures between 343° C. and 371° C. By contrast, the CoMo catalyst provided between 90 wt % to 94 wt % sulfur removal at 343° C. The NiMo catalyst resulted in still less sulfur removal, with the NiMo catalyst resulting in greater than 95 wt % sulfur removal only at the highest temperature investigated of 371° C. The data in FIG. 2 suggests that the NiCoMo catalyst had higher activity for sulfur removal than the NiMo or CoMo catalyst.

Figure 3:
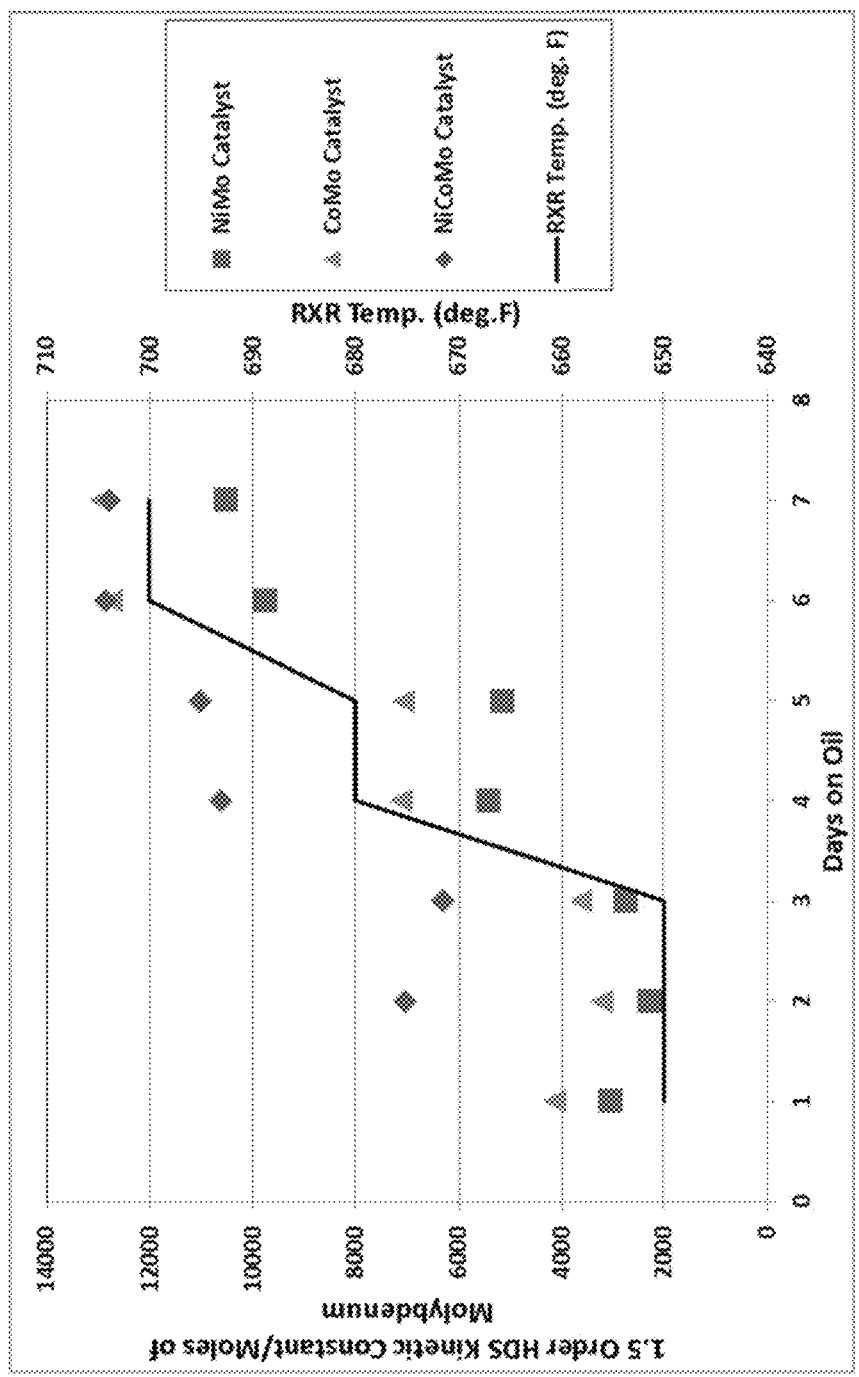
FIG. 3 shows normalized activity constants results from processing a distillate feed over the supported base metal dewaxing catalysts in FIG. 2.

FIG. 3 shows the corresponding kinetic rate constants for sulfur removal for each catalyst based on the molar amount of molybdenum present in each catalyst loading. Normalizing the catalyst activity based on the molar amount of molybdenum provides a way to account for differences in catalyst density. The desulfurization data in FIG. 2 was fit to a 1.5 order kinetic model, as would be expected by one of skill in the art for modeling of sulfur removal under hydroprocessing conditions. As shown in FIG. 3, the normalized kinetic rate constants provide a clearer demonstration of the differences in activity between the catalysts. In particular, the data in FIG. 2 is compressed at higher temperature due to the limit of not being able to remove more than 100 wt % of sulfur from the feed. Determining the kinetic rate constants for the catalysts, as shown in FIG. 3, allows for further distinction between the performance of the catalysts. As shown in FIG. 3, the NiCoMo catalyst clearly provided higher activity for sulfur removal at all temperatures in comparison with the NiMo catalyst, and comparable or greater activity in comparison with the CoMo catalyst.

Figure 4:
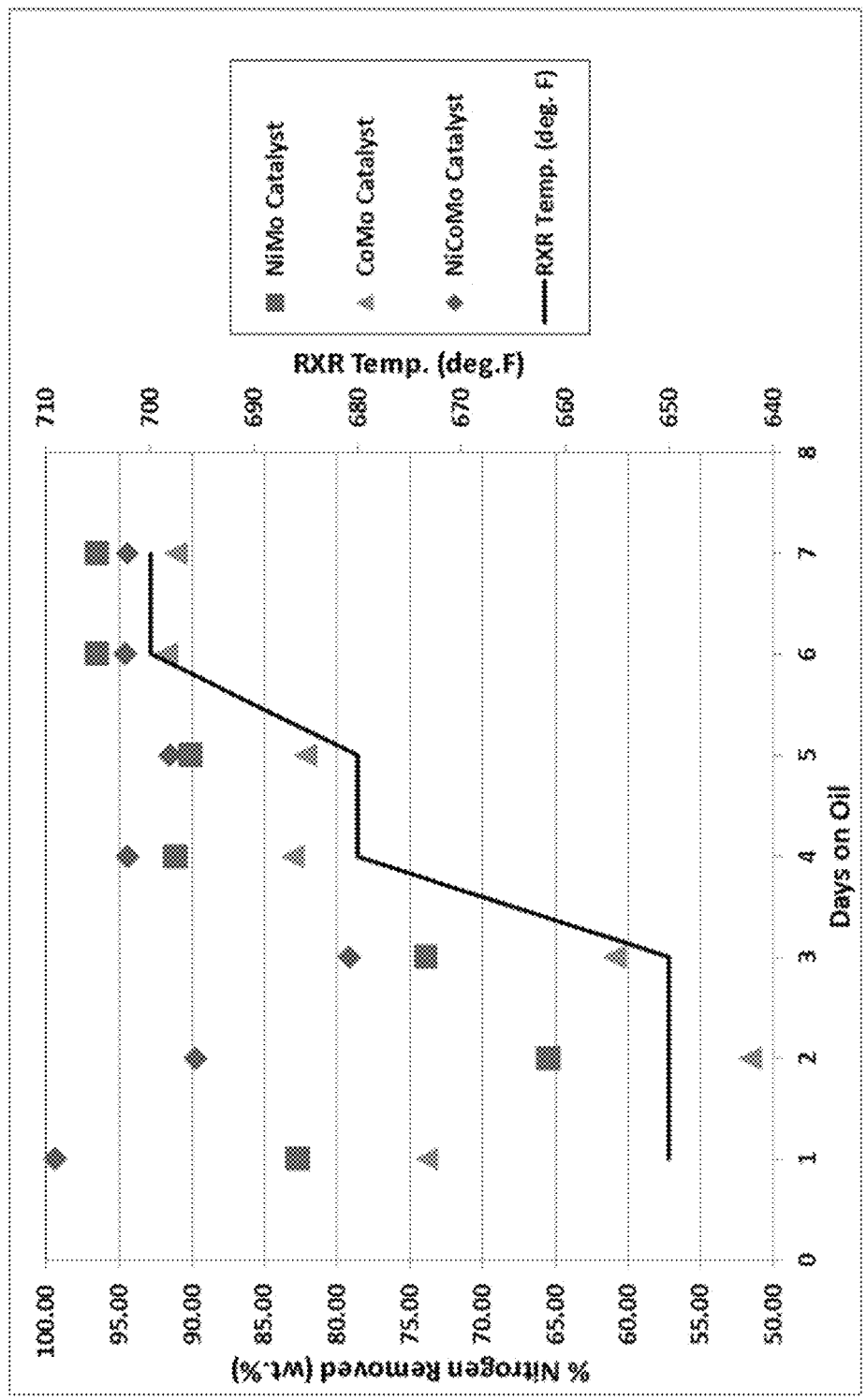
FIG. 4 shows results for nitrogen removal during processing a distillate feed over various supported base metal dewaxing catalysts.

The NiCoMo catalyst also exhibited greater activity for nitrogen removal. FIG. 4 shows nitrogen removal results based on exposing the feed in Table 4 to the three catalyst loadings shown in Table 3. As shown in FIG. 4, the NiCoMo catalyst provided greater than 90 wt % sulfur removal under the reaction conditions for all temperatures between 343° C. and 371° C. The relative order of nitrogen removal was reversed for the CoMo and NiMo catalysts relative to the sulfur removal results. In FIG. 4, the CoMo catalyst provided the lowest nitrogen removal at all temperatures. The NiMo catalyst achieved greater nitrogen removal than the CoMo catalyst, but was still below 90 wt % removal at 343° C. The data in FIG. 4 suggests that the NiCoMo catalyst had comparable or higher activity for nitrogen removal than the NiMo or CoMo catalyst.

Figure 5:
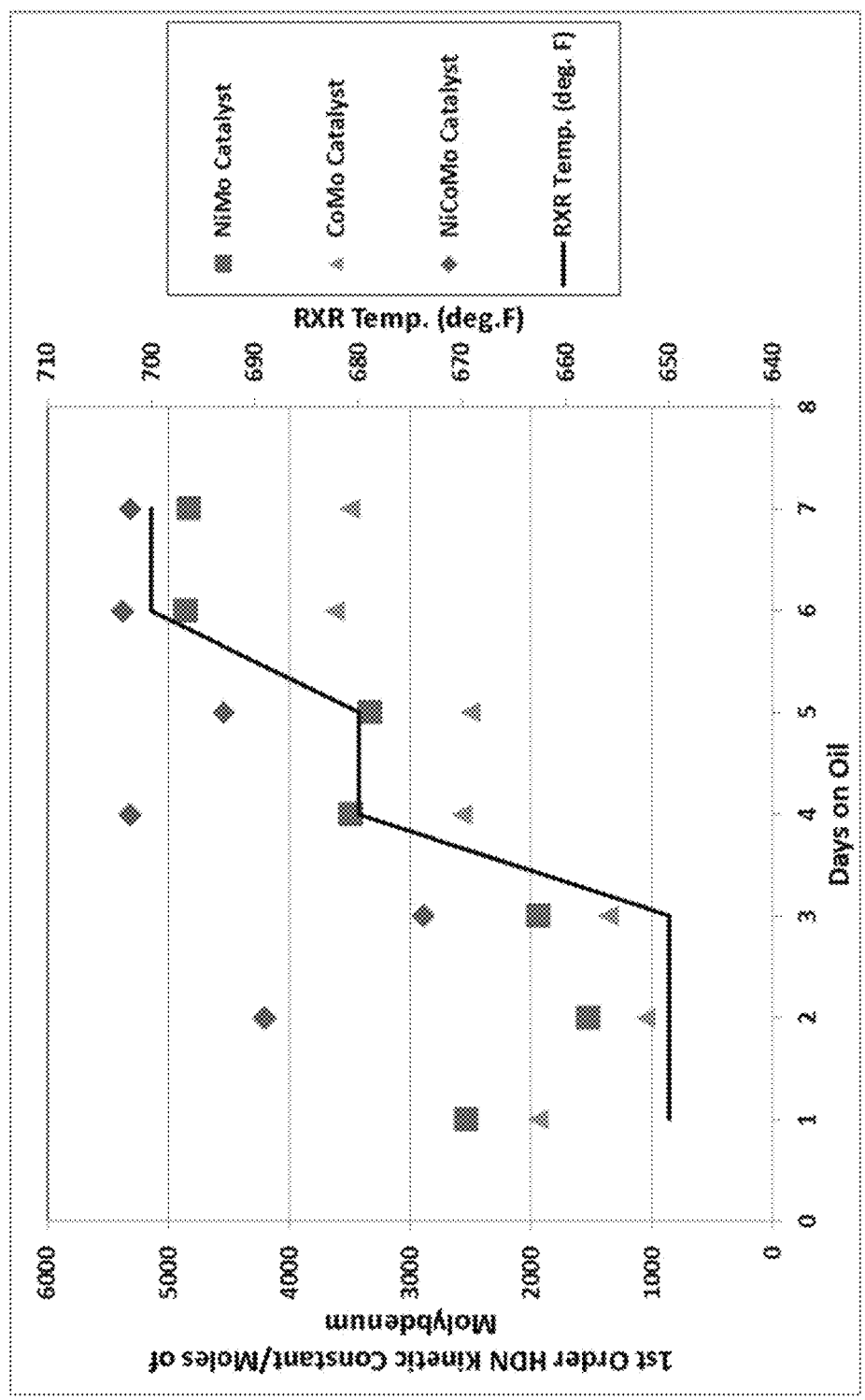
FIG. 5 shows normalized activity constants results from processing a distillate feed over the supported base metal dewaxing catalysts in FIG. 4.

FIG. 5 shows the corresponding kinetic rate constants for nitrogen removal for each catalyst based on the molar amount of molybdenum present in each catalyst loading. Normalizing the catalyst activity based on the molar amount of molybdenum provides a way to account for differences in catalyst density. The denitrogenation data in FIG. 4 was fit to a first order kinetic model, as would be expected by one of skill in the art for modeling of nitrogen removal under hydroprocessing conditions. As shown in FIG. 5, the NiCoMo catalyst clearly provided higher activity for nitrogen removal at all temperatures in comparison with the CoMo catalyst, and comparable or greater activity in comparison with the NiMo catalyst.

Figure 6:
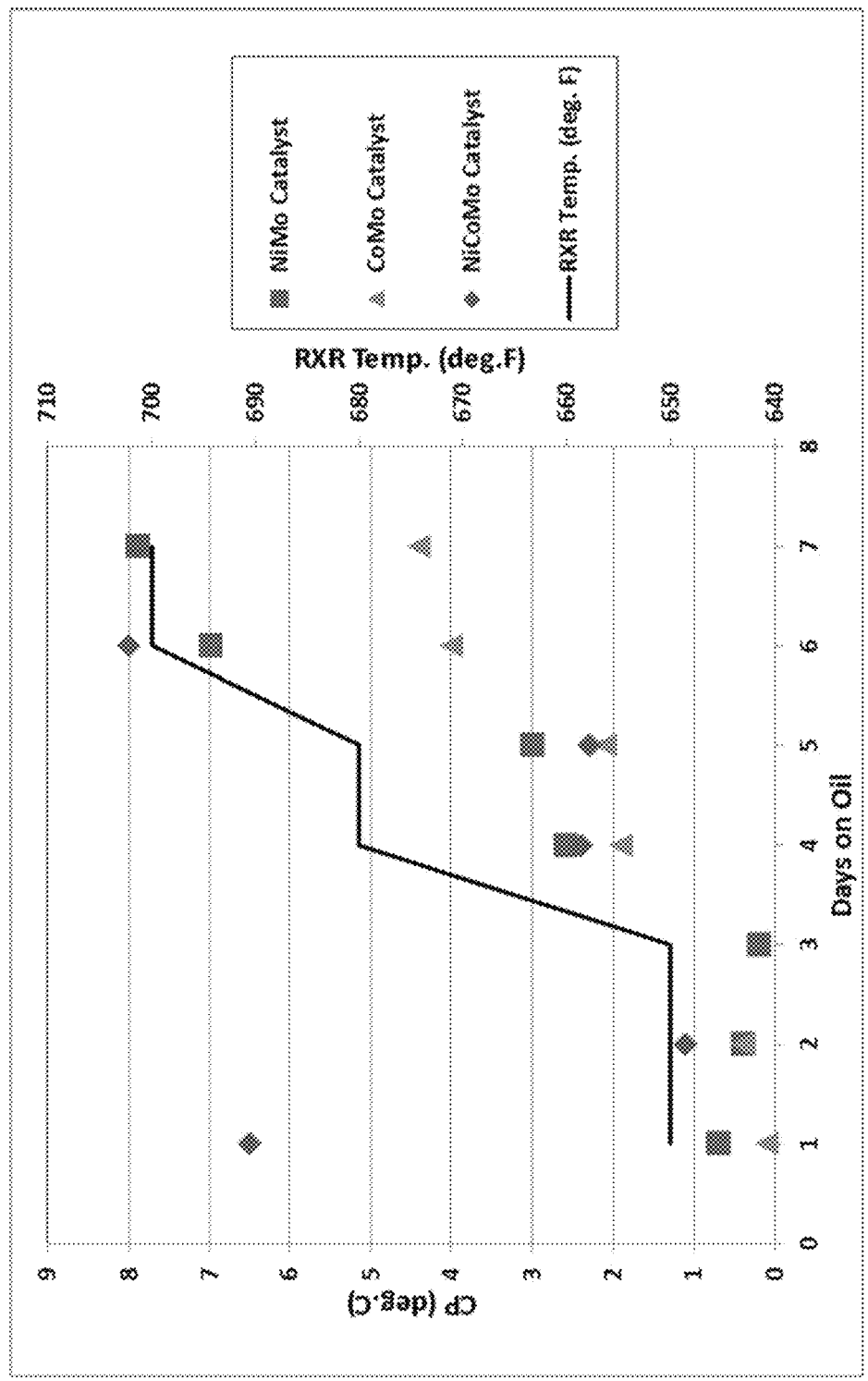
FIG. 6 shows results for cloud point reduction during processing a distillate feed over various supported base metal dewaxing catalysts.
Figure 7:
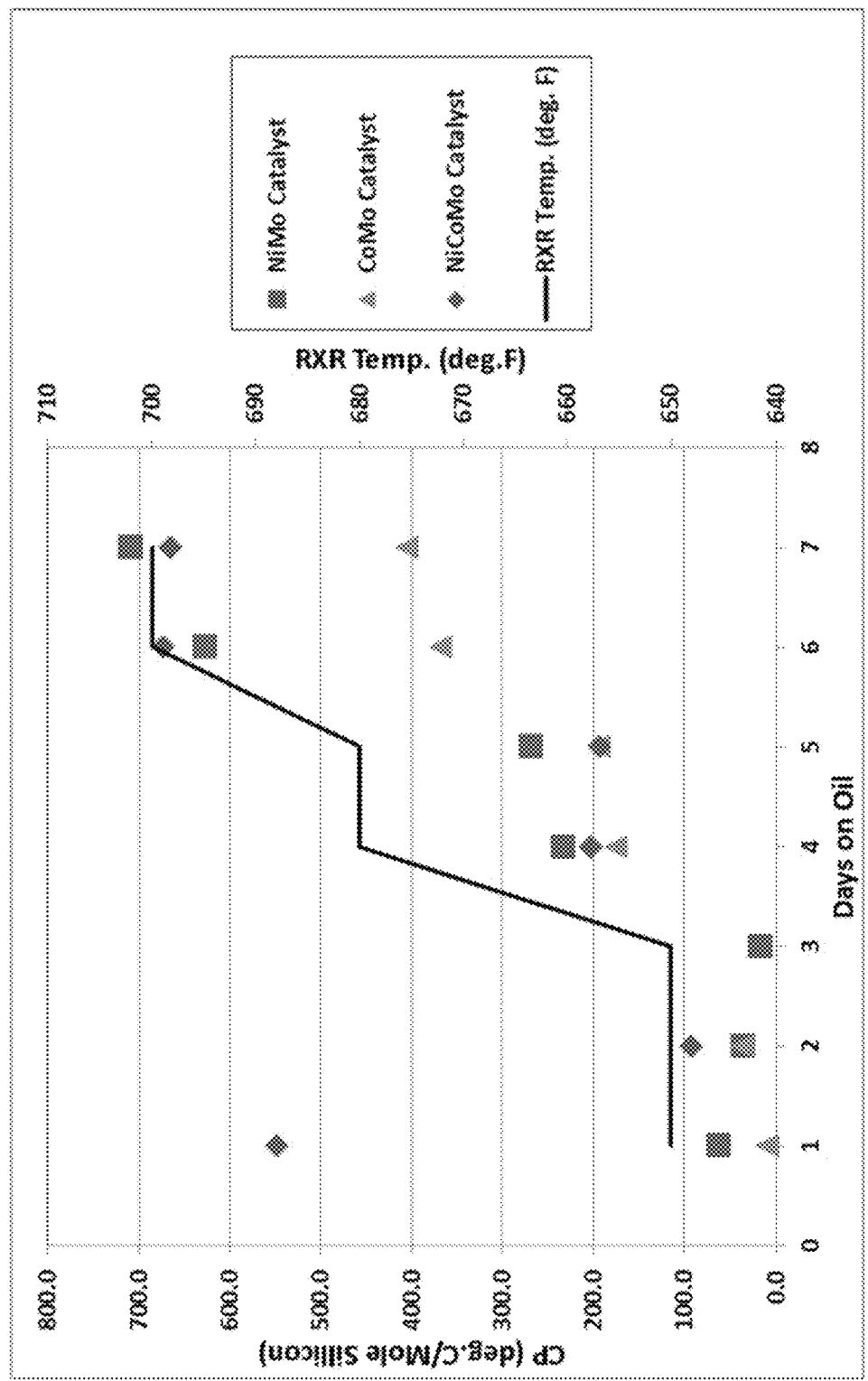
FIG. 7 shows results for cloud point reduction normalized based on the molar silicon content of the catalysts from processing a distillate feed over the supported base metal dewaxing catalysts in FIG. 6.

Based on FIGS. 2-5, the catalyst including two Group 8-10 base metals provided superior activity to a NiMo or CoMo catalyst with respect to sulfur removal and/or nitrogen removal. FIG. 6 shows that the NiCoMo catalyst provided this activity advantage for heteroatom removal while maintaining a comparable activity for cloud point reduction. FIG. 6 shows the cloud point reduction for the three types of catalysts at the same reaction conditions as the data in FIGS. 2-5. Feed and product cloud points were measured using ASTM method D5773. At the lower reaction temperatures, all of the catalysts appeared to provide comparable activity for cloud point reduction. At the higher temperature of 371° C., the CoMo catalyst appeared to provide a lower amount of cloud point reduction in comparison with the NiMo and NiCoMo catalysts. FIG. 7 shows the cloud point data from FIG. 6 after being normalized based on the molar silicon content of the catalysts. The normalized cloud point reduction data in FIG. 7 leads to similar conclusions, with all catalysts having comparable cloud point reduction at lower temperatures.

ADDITIONAL EMBODIMENTS

Embodiment 1

A catalyst precursor comprising at least two Group 8-10 base metals, at least one Group 6 metal, and a dispersion agent supported on a support comprising a zeolitic framework structure, the catalyst precursor having a molar ratio of a first Group 8-10 base metal to a second Group 8-10 base metal of 0.1 to 10 (or 0.2 to 2.0, or 0.3 to 3.0), a molar ratio of the at least two Group 8-10 base metals to the at least one Group 6 metal of 0.1 to 1.0 (or 0.2 to 0.8, or 0.4 to 0.6), and a molar ratio of dispersion agent to the at least two Group 8-10 base metals and the at least one Group 6 metal of 0.5 to 3.0 (or 0.9 to 3.0, or 0.9 to 2.2).

Embodiment 2

A method of forming a composition, comprising: impregnating a support comprising a zeolitic framework structure with a solution comprising a Group 6 metal salt, at least two Group 8-10 base metal salts, and a dispersion agent to form a catalyst precursor, the dispersion agent comprising a compound having 2-10 carbon atoms and a carbon atom to oxygen atom ratio of about 0.6 to about 2.0, a molar ratio of dispersion agent to Group 8-10 non-noble metal being about 0.5 to 5.0; and drying the catalyst precursor at a temperature of about 80° C. to about 200° C.

Embodiment 3

The method of forming a composition of Embodiment 2, the catalyst precursor having a molar ratio of a first Group 8-10 base metal to a second Group 8-10 base metal of 0.1 to 10 (or 0.2 to 2.0, or 0.3 to 3.0), a molar ratio of the at least two Group 8-10 base metals to the at least one Group 6 metal of 0.1 to 1.0 (or 0.2 to 0.8, or 0.4 to 0.6), and a molar ratio of dispersion agent to the at least two Group 8-10 base metals and the at least one Group 6 metal of 0.5 to 3.0 (or 0.9 to 3.0, or 0.9 to 2.2).

Embodiment 4

The method of forming a composition of Embodiment 2 or 3, wherein the at least two Group 8-10 non-noble metal salts comprise an Ni salt and a Co salt; wherein a molar ratio of dispersion agent to total metals in the solution is about 0.1 to about 5.0, or about 0.2 to about 2.0; or a combination thereof.

Embodiment 5

The method of forming a composition of any of Embodiments 2 to 4, the method further comprising sulfiding the catalyst precursor under effective sulfiding conditions to form a dewaxing catalyst.

Embodiment 6

The catalyst precursor or method of forming a composition of any of the above embodiments, wherein the zeolitic framework structure comprises an MEL framework structure, the MEL framework structure optionally comprising ZSM-11, the MEL framework structure optionally comprising a) a molar ratio of silica to alumina of about 35 to about 55; b) an alpha value of at least about 380; c) a total surface area of at least about 350 m$^2$/g, or d) a combination thereof.

Embodiment 7

The catalyst precursor or method of forming a composition of any of Embodiments 1-5, wherein the zeolitic framework structure comprises ZSM-48, ZSM-11, a zeolitic framework structure having a 10-member ring as a largest pore channel, or a combination thereof.

Embodiment 8

The catalyst precursor or method of forming a composition of any of the above embodiments, wherein the catalyst precursor comprises about 2.0 wt % to about 30 wt % of the at least one Group 6 metal and at least two Group 8-10 base metals based on a weight of the catalyst precursor, the at least two Group 8-10 base metals optionally comprising Ni and Co, the at least one Group 6 metal optionally comprising W, Mo, or a combination thereof.

Embodiment 9

The catalyst precursor or method of forming a composition of any of the above embodiments, wherein the dispersion agent comprises a compound having 2-10 carbon atoms and a carbon atom to oxygen atom ratio of about 0.6 to about 2.0.

Embodiment 10

The catalyst precursor or method of forming a composition of any of the above embodiments, wherein the dispersion agent comprises a glycol, a carboxylic acid, or a combination thereof; or wherein the dispersion agent comprises citric acid, gluconic acid, nitrilotriacetic acid, ethylene glycol, or a combination thereof.

Embodiment 11

The catalyst precursor or method of forming a composition of any of the above embodiments, wherein the support further comprises an alumina binder, the alumina binder optionally having a surface area of about 150 m$^2$/g or less.

Embodiment 12

A method for treating a distillate boiling range feed, comprising: exposing a distillate boiling range feed to a dewaxing catalyst under effective hydroprocessing conditions, the dewaxing catalyst comprising at least one Group 6 metal sulfide and at least two Group 8-10 base metal sulfides, the dewaxing catalyst being formed by impregnating a support comprising a zeolitic framework structure with an impregnation solution comprising a Group 6 metal salt, at least two Group 8-10 base metal salts, and a dispersion agent to form a catalyst precursor, the dispersion agent comprising a compound having 2-10 carbon atoms and a carbon atom to oxygen atom ratio of about 0.6 to about 2.0; drying the catalyst precursor at a temperature of about 80° C. to about 200° C.; and sulfiding the dried catalyst precursor under effective sulfiding conditions.

Embodiment 13

The method of Embodiment 12, the dewaxing catalyst having a molar ratio of a first Group 8-10 base metal to a second Group 8-10 base metal of 0.1 to 10 (or 0.2 to 2.0, or 0.3 to 3.0) and a molar ratio of the at least two Group 8-10 base metals to the at least one Group 6 metal of 0.1 to 1.0 (or 0.2 to 0.8, or 0.4 to 0.6), the catalyst precursor having a molar ratio of dispersion agent to the at least two Group 8-10 base metals and the at least one Group 6 metal of 0.5 to 3.0 (or 0.9 to 3.0, or 0.9 to 2.2) prior to the sulfiding.

Embodiment 14

The method of any of Embodiments 11-13, wherein the effective hydroprocessing conditions comprise at least one of effective hydrotreating conditions and effective catalytic dewaxing conditions; wherein the method further comprises exposing the distillate boiling range feed to a hydrotreating catalyst; or a combination thereof

Embodiment 15

The method of any of Embodiments 5-14, wherein the catalyst precursor is sulfided without prior calcining of the catalyst precursor.

Additional Embodiment A. A method for treating a distillate boiling range feed, comprising: exposing a distillate boiling range feed to a dewaxing catalyst under effective hydroprocessing conditions, the dewaxing catalyst comprising at least one Group 6 metal sulfide and at least two Group 8-10 base metal sulfides, the dewaxing catalyst being formed by a) the method of forming a composition according to any of Embodiments 5-10 or b) by sulfiding a catalyst precursor according to any of Embodiments 1 and 6-10 under effective sulfiding conditions, the catalyst precursor optionally being sulfided without prior calcining of the catalyst precursor.

Additional Embodiment B. A method for treating a distillate boiling range feed, comprising: exposing a distillate boiling range feed to a hydrotreating catalyst under effective hydroprocessing conditions to form a hydrotreated effluent; and exposing at least a portion of the hydrotreated effluent to a dewaxing catalyst under effective hydroprocessing conditions, the dewaxing catalyst at least one Group 6 metal sulfide and at least two Group 8-10 base metal sulfides, the dewaxing catalyst being formed by impregnating a support comprising a zeolitic framework structure with an impregnation solution comprising a Group 6 metal salt, at least two Group 8-10 base metal salts, and a dispersion agent to form a catalyst precursor, the dispersion agent comprising a compound having 2-10 carbon atoms and a carbon atom to oxygen atom ratio of about 0.6 to about 2.0; drying the catalyst precursor at a temperature of about 80° C. to about 200° C.; and sulfiding the dried catalyst precursor under effective sulfiding conditions.

Although the present invention has been described in terms of specific embodiments, it is not so limited. Suitable alterations/modifications for operation under specific conditions should be apparent to those skilled in the art. It is therefore intended that the following claims be interpreted as covering all such alterations/modifications as fall within the true spirit/scope of the invention.

The invention claimed is:

1. A catalyst precursor comprising at least two Group 8-10 base metals, at least one Group 6 metal, and a dispersion agent supported on a support comprising a zeolitic framework structure having a 10-member ring as a largest pore channel, the catalyst precursor having a molar ratio of a first Group 8-10 base metal to a second Group 8-10 base metal of 0.1 to 10, a molar ratio of the at least two Group 8-10 base metals to the at least one Group 6 metal of 0.1 to 1.0, and a molar ratio of dispersion agent to the at least two Group 8-10 base metals and the at least one Group 6 metal of 0.5 to 3.0.

2. The catalyst precursor of claim 1, wherein the zeolitic framework structure comprises ZSM-48, ZSM-11, an MEL framework structure, an MRE framework structure, or a combination thereof.

3. The catalyst precursor of claim 2, wherein the zeolitic framework structure comprises an MEL framework structure, the zeolitic framework structure further comprising a) a molar ratio of silica to alumina of about 35 to about 55; b) an alpha value of at least about 380; c) a total surface area of at least about 350 $m^2/g$, or d) a combination thereof.

4. The catalyst precursor of claim 1, wherein the catalyst precursor comprises about 2.0 wt % to about 30 wt % of the at least one Group 6 metal and at least two Group 8-10 base metals based on a weight of the catalyst precursor, the at least two Group 8-10 base metals optionally comprising Ni and Co, the at least one Group 6 metal optionally comprising W, Mo, or a combination thereof.

5. The catalyst precursor of claim 1, wherein the dispersion agent comprises a compound having 2-10 carbon atoms and a carbon atom to oxygen atom ratio of about 0.6 to about 2.0.

6. The catalyst precursor of claim 1, wherein the dispersion agent comprises a glycol, a carboxylic acid, or a combination thereof.

7. The catalyst precursor of claim 1, wherein the dispersion agent comprises citric acid, gluconic acid, nitrilotriacetic acid, ethylene glycol, or a combination thereof.

8. The catalyst precursor of claim 1, wherein the support further comprises an alumina binder, the alumina binder optionally having a surface area of about 150 $m^2/g$ or less.

* * * * *